US007961950B2

(12) United States Patent
Sato

(10) Patent No.: US 7,961,950 B2
(45) Date of Patent: Jun. 14, 2011

(54) IMAGE PROCESSING APPARATUS, METHOD THEREOF, AND ITS CONTROL METHOD

(75) Inventor: Mineko Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1060 days.

(21) Appl. No.: 11/288,165

(22) Filed: Nov. 29, 2005

(65) Prior Publication Data

US 2006/0114485 A1 Jun. 1, 2006

(30) Foreign Application Priority Data

Nov. 30, 2004 (JP) .................................. 2004-347235

(51) Int. Cl.
*G06K 9/48* (2006.01)
(52) U.S. Cl. ........................................................ 382/197
(58) Field of Classification Search .......................... None
See application file for complete search history.

(56) References Cited

U.S. PATENT DOCUMENTS

| 4,718,105 | A | * | 1/1988 | Lipkie et al. ................. 382/243 |
| 4,780,810 | A | * | 10/1988 | Torii et al. ......................... 712/6 |
| 4,807,182 | A | * | 2/1989 | Queen .......................... 715/210 |
| 5,050,222 | A | * | 9/1991 | Lee ................................ 382/176 |
| 6,020,981 | A | * | 2/2000 | Ogiyama ...................... 358/434 |
| 6,466,329 | B1 | * | 10/2002 | Mukai .......................... 358/1.15 |
| 6,958,821 | B1 | * | 10/2005 | McIntyre ...................... 358/1.12 |
| 7,224,477 | B2 | * | 5/2007 | Gassho et al. ............... 358/1.14 |
| 7,548,916 | B2 | | 6/2009 | Kaneda |
| 2002/0044299 | A1 | * | 4/2002 | Iwase et al. ................. 358/1.15 |
| 2002/0122189 | A1 | * | 9/2002 | Salgado ........................ 358/1.6 |
| 2002/0196976 | A1 | * | 12/2002 | Mihcak et al. ............... 382/173 |
| 2003/0021481 | A1 | * | 1/2003 | Kasutani ....................... 382/218 |
| 2004/0213458 | A1 | * | 10/2004 | Kanatsu ....................... 382/181 |
| 2004/0220962 | A1 | * | 11/2004 | Kaneda ........................ 707/102 |
| 2005/0105824 | A1 | * | 5/2005 | Kesal et al. .................. 382/278 |
| 2005/0114667 | A1 | * | 5/2005 | Haas ............................ 713/176 |
| 2005/0129290 | A1 | * | 6/2005 | Lo et al. ....................... 382/124 |

FOREIGN PATENT DOCUMENTS

| JP | 8-36564 | 2/1996 |
| JP | 2000-151581 | 5/2000 |
| JP | 2004302616 A | 10/2004 |
| JP | 2004334339 A | 11/2004 |

* cited by examiner

*Primary Examiner* — Samir A Ahmed
*Assistant Examiner* — Jayesh Patel
(74) *Attorney, Agent, or Firm* — Fitzpatrick, Cella, Harper & Scinto

(57) ABSTRACT

It is very important to manage digital documents and documents obtained by printing the digital documents. After completion of a conference, each participant makes an MFP read a document image of a distributed reference. The MFP searches for a data file which matches the read document image with reference to information in a storage unit, and deletes the detected data file. If the number of pages of the read image is short, the data file cannot be detected, or the read document image shows a partial loss, the MFP generates a warning. Upon reception of a collection completion message, the MFP checks with reference to information in the storage unit if all data files associated with the conference are deleted. If a data file to be deleted still remains and that data file is printed, the MFP generates a warning.

3 Claims, 21 Drawing Sheets

FIG. 5A

BLOCK INFORMATION

| | ATTRIBUTE | COORDINATE X | COORDINATE Y | WIDTH W | HEIGHT H | POINTER INFORMATION |
|---|---|---|---|---|---|---|
| BLOCK 1 | 1 | X1 | Y1 | W1 | H1 | PRESENT |
| BLOCK 2 | 3 | X2 | Y2 | W2 | H2 | PRESENT |
| BLOCK 3 | 2 | X3 | Y3 | W3 | H3 | ABSENT |
| BLOCK 4 | 1 | X4 | Y4 | W4 | H4 | PRESENT |
| BLOCK 5 | 3 | X5 | Y5 | W5 | H5 | PRESENT |
| BLOCK 6 | 5 | X6 | Y6 | W6 | H6 | ABSENT |

*ATTRIBUTE 1:TEXT 2:PICTURE 3:TABLE 4:LINE 5:PHOTO

FIG. 5B

INPUT FILE INFORMATION

| TOTAL NUMBER OF BLOCKS | N(=6) |
|---|---|

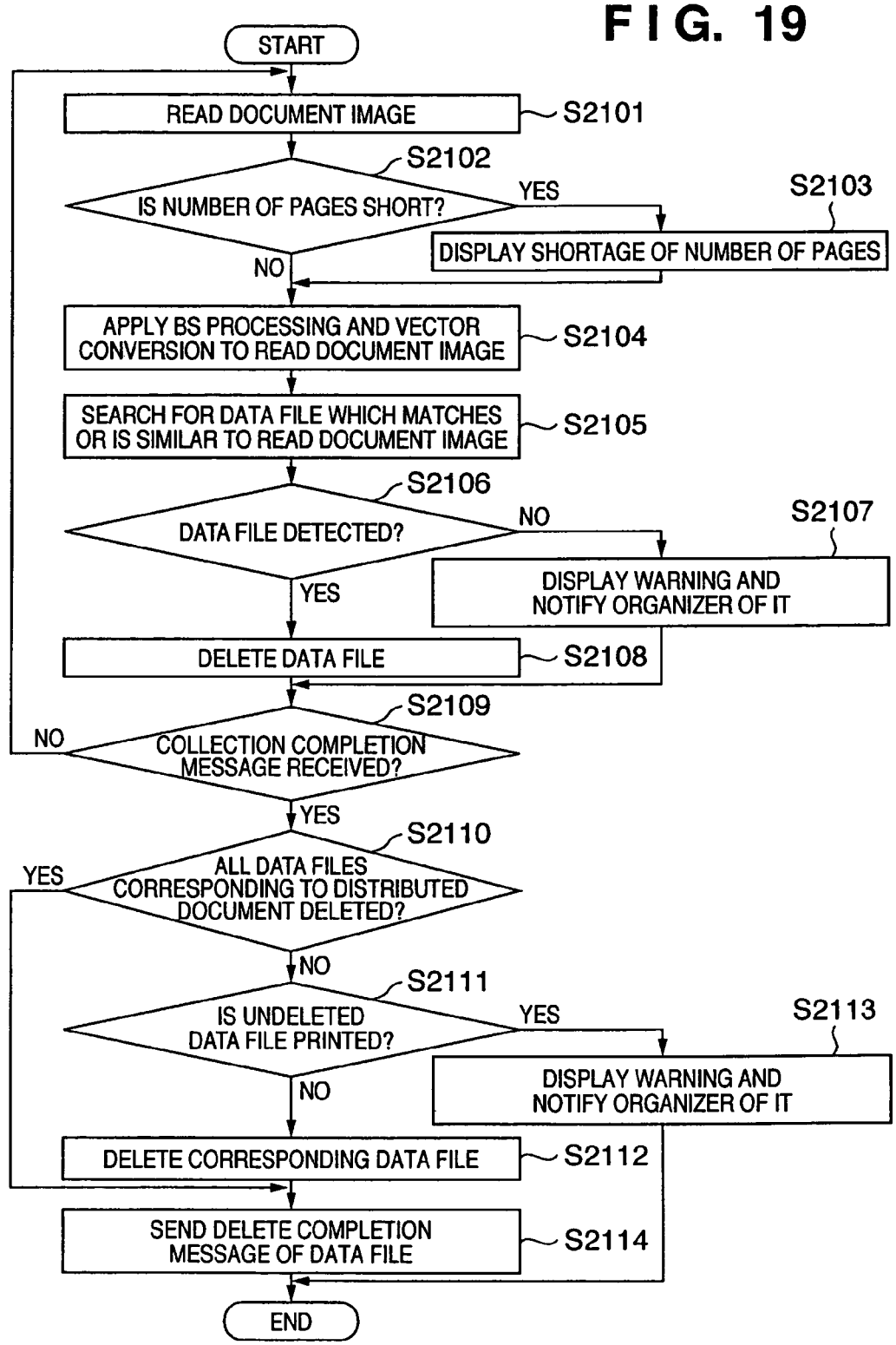

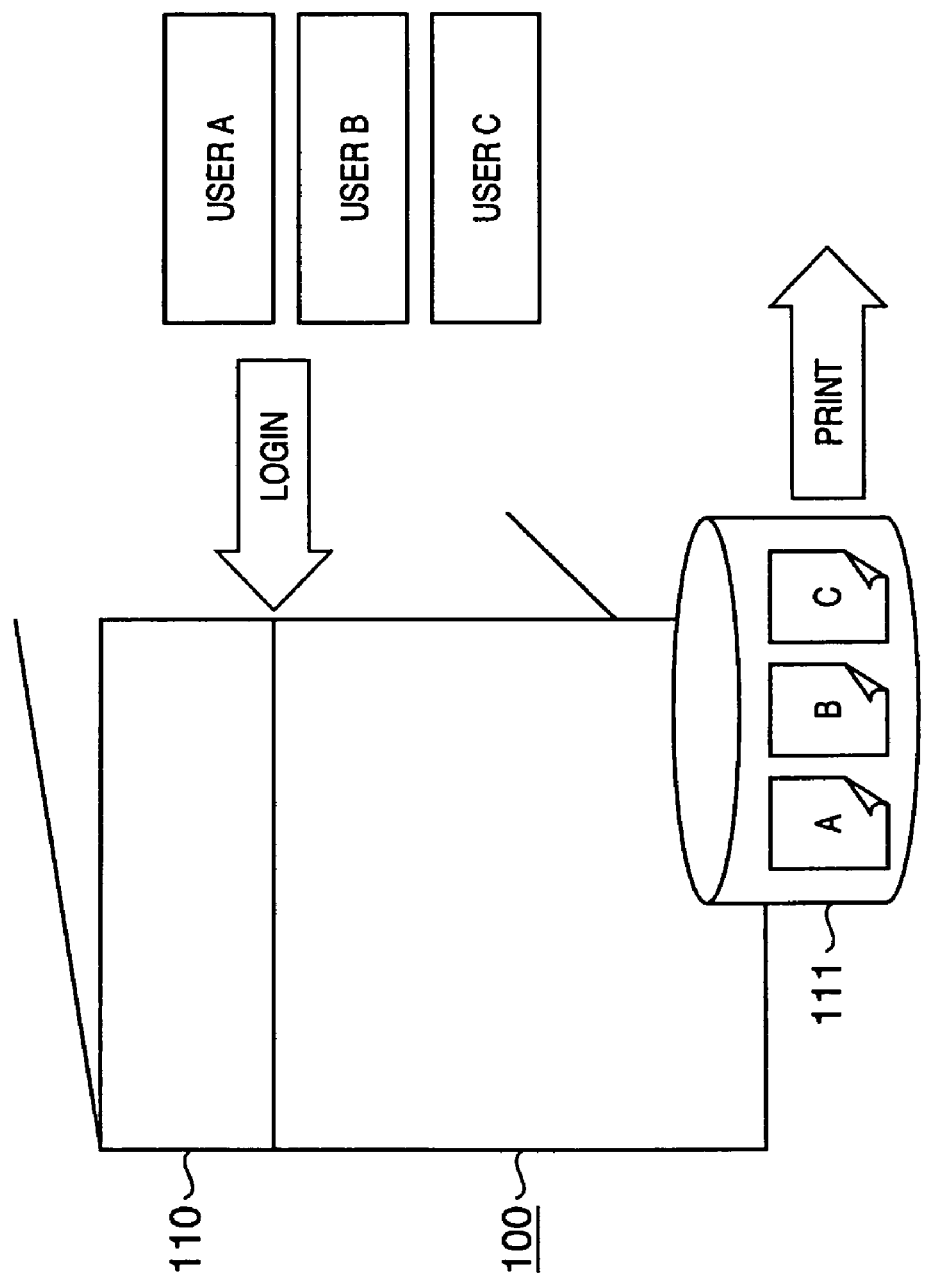

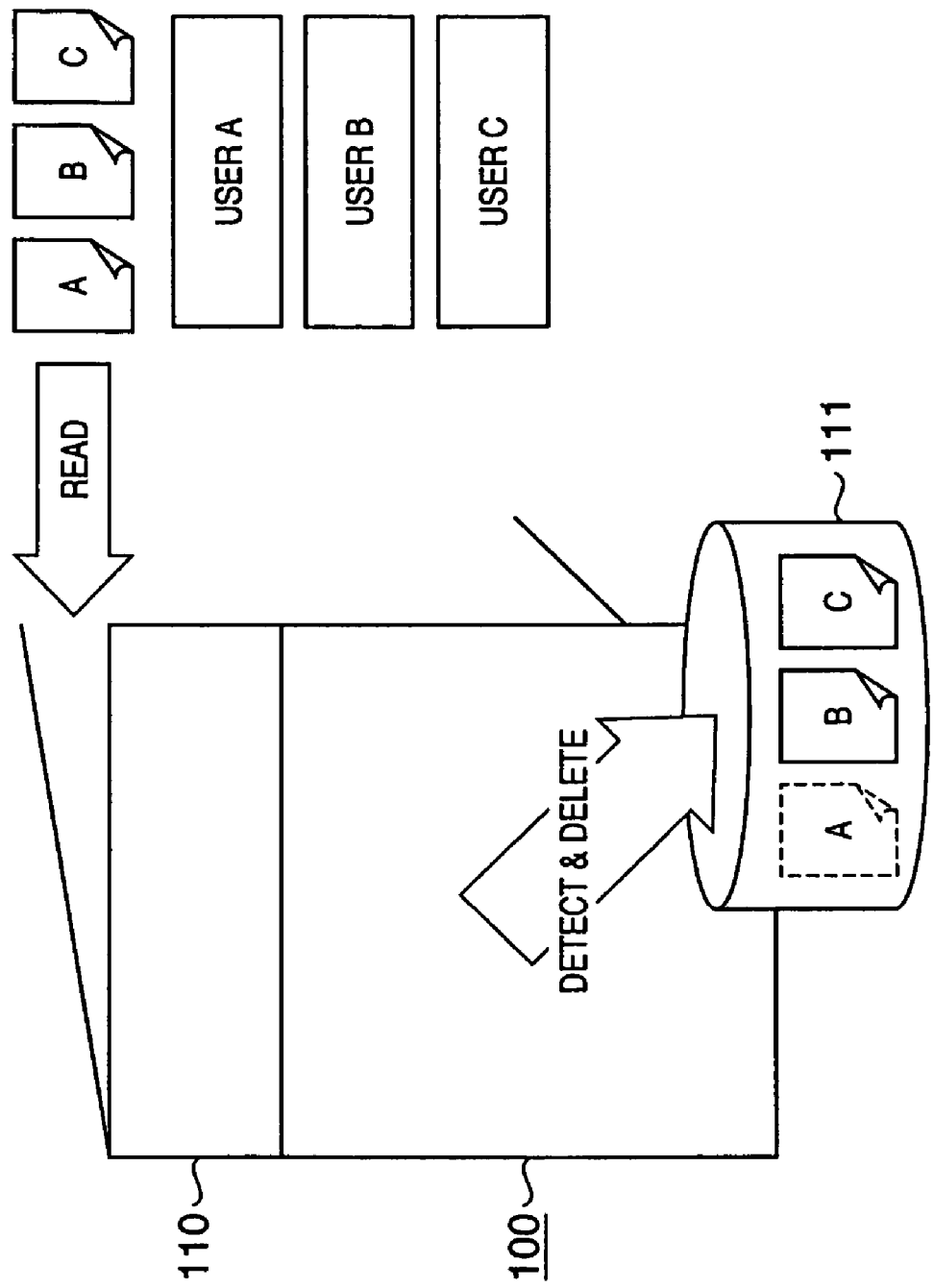

IMAGE PROCESSING APPARATUS, METHOD THEREOF, AND ITS CONTROL METHOD

FIELD OF THE INVENTION

The present invention relates to an image processing apparatus, method thereof, and its control method and, more particularly, to distribution and collection of documents.

BACKGROUND OF THE INVENTION

Along with digitization of information, it has become more easy to share and use information over a broad range. Then again, it is very important to manage digital documents and documents obtained by printing the digital documents.

Japanese Patent Application No. 10-319611 (corresponding to Japanese Patent Laid-Open No. 2000-151581) discloses a technique for collecting documents based on barcodes printed on documents. Also, Japanese Patent Application No. 6-170584 (corresponding to Japanese Patent Laid-Open No. 8-36564) discloses a system that pertains to distribution and collection of digital documents.

The aforementioned techniques append barcodes or the like indicating the locations of original digital documents to printed documents so as to detect original digital documents. However, if such barcodes are damaged or contaminated, original digital documents can no longer be detected. Since printed documents and original digital documents are not simultaneously managed, if documents are discarded, printed documents must be collected and discarded, and original digital documents must be separately erased. This discard job is very complicated in terms of management, and secret information which remains stored in a storage device may leak if original digital documents are forgotten to be erased.

SUMMARY OF THE INVENTION

The first aspect of the present invention discloses the following technique. That is, a digital document which corresponds to a given user and is stored in a memory is printed on a print medium. After that, a reader is controlled to read an image of the document to search for a digital document which corresponds to the read image and is stored in the memory.

The second aspect of the present invention discloses image processing for reading an image of a document, vector-converting the read image, searching for a file using the vector-converted image, and deleting the found file.

According to the present invention, documents and their digital documents can be simultaneously managed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B show an example of the block selection result;

FIG. 19 is a flowchart showing the document collection sequence by the MFP;

FIG. 20 is a view for explaining distribution of documents by the MFP; and

FIG. 21 is a view for explaining collection of documents by the MFP.

DETAILED DESCRIPTION OF THE PREFERRED EMBODIMENTS

Image processing according to preferred embodiments of the present invention will be described in detail hereinafter.

First Embodiment

[Image Processing System]

Figure 1:
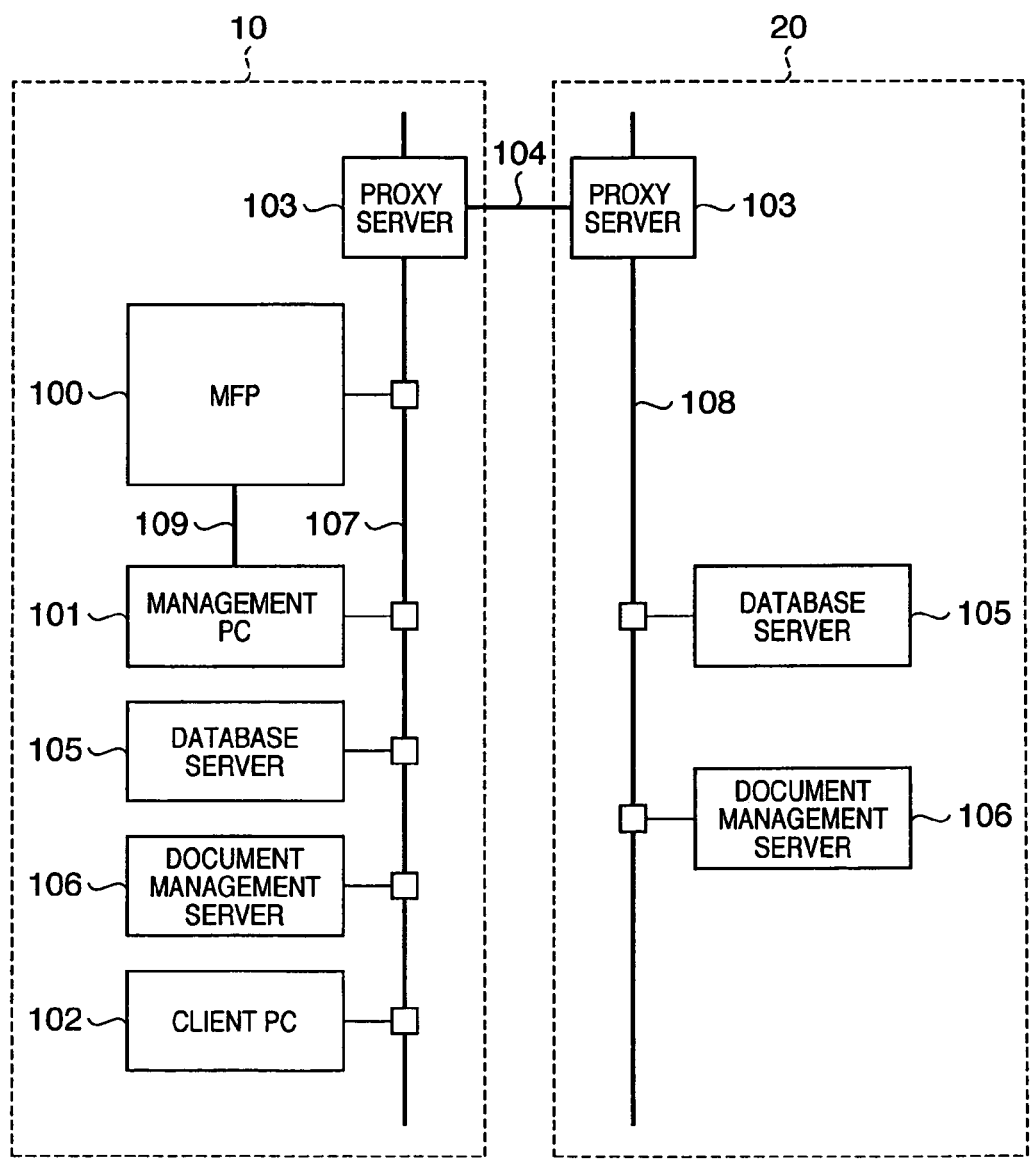
FIG. 1 is a block diagram showing the arrangement of an image processing system which digitizes information using a multi-functional peripheral equipment (MFP)

FIG. 1 is a block diagram showing the arrangement of an image processing system which digitizes information using a multi-functional peripheral equipment.

This image processing system is implemented in an environment in which offices (or a plurality of office-like partitions) 10 and 20 are connected via a wide area network (WAN) 104 such as the Internet or the like.

To a local area network (LAN) 107 formed in the office 10, a multi-functional peripheral equipment (MFP) 100, management PC 101 which controls the MFP 100, client PC 102, document management server 106, database server 105 managed by the document management server 106, and the like are connected. To a LAN 108 formed in the office 20, at least a document management server 106, database server 105 managed by the document management server 106, and the like are connected. The LANs 107 and 108 of the offices 10 and 20 are connected to each other via a proxy server 103 connected to the LAN 107, the WAN 104, and a proxy server 103 connected to the LAN 108.

The MFP 100 does some of image processes for reading a document image, and processing a read image. An image signal output from the MFP 100 is input to the management PC 101 via a communication line 109. The management PC 101 comprises a normal personal computer (PC), and has a memory such as a hard disk or the like for storing images, an image processor implemented by hardware or software, a monitor such as a CRT, LCD, or the like, and an input unit including a mouse, keyboard, and the like. Some components of the management PC 101 are integrally formed with the MFP 100. Note that a case will be exemplified hereinafter wherein the management PC 101 executes search processing and the like to be described later, but the MFP 100 may execute the processing to be executed by the management PC 101.

[MFP]

Figure 2:
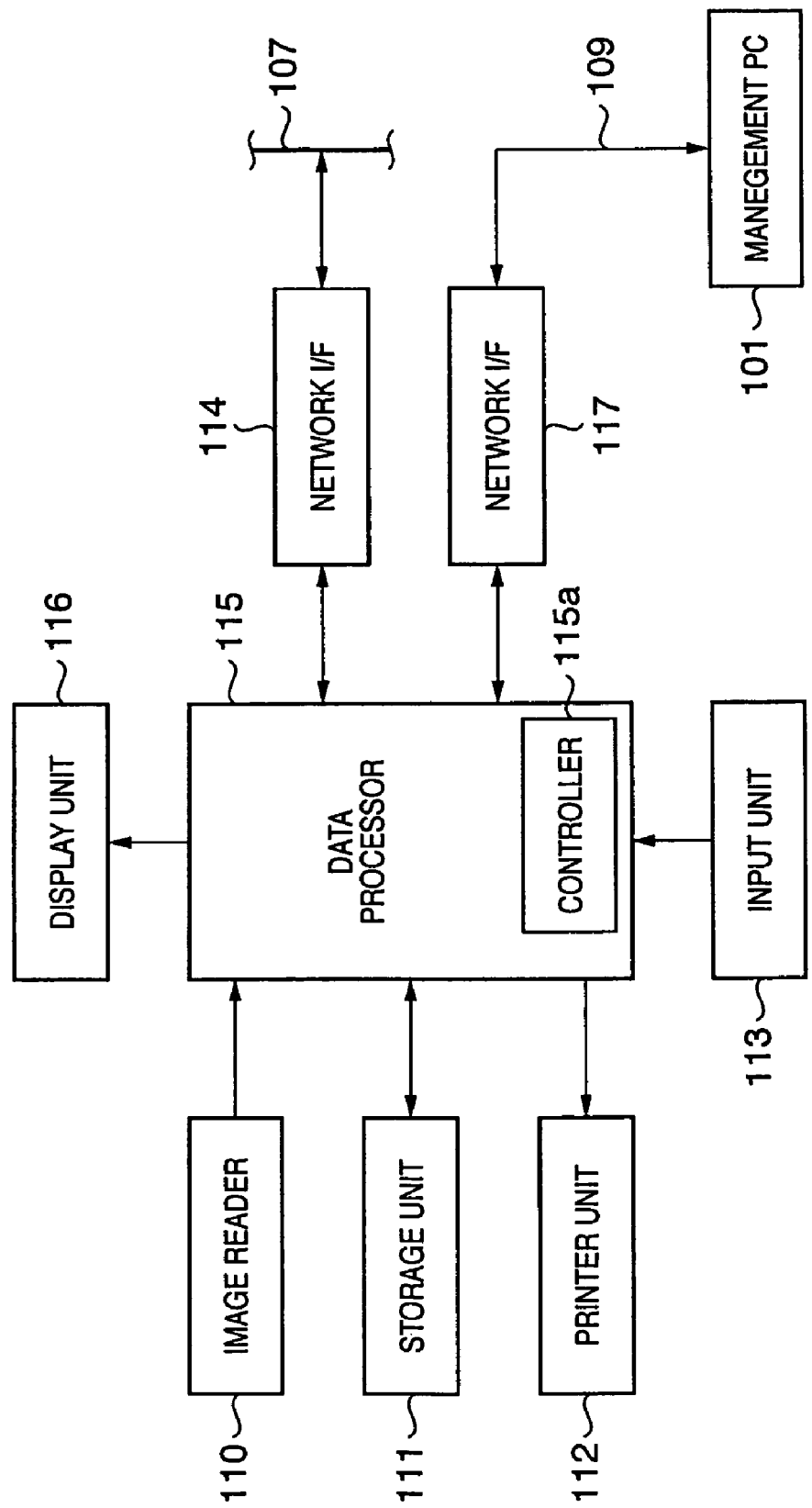
FIG. 2 is a block diagram showing the arrangement of the MFP.

FIG. 2 is a block diagram showing the arrangement of the MFP 100.

An image reader 110 including an auto document feeder (ADF) irradiates an image on each of one or a plurality of stacked documents with light coming from a light source, and forms an image of light reflected by the document on a solid-state image sensing element via a lens. Then, the image reader 110 obtains a read image signal (e.g., 600 dpi, 8 bits) in the raster order from the solid-state image sensing element. When a document is to be copied, a data processor 115 converts this read image signal into a print signal. When an image is copied on a plurality of print sheets, the data processor 115 temporarily stores a print signal for one page in a storage unit 111, and repetitively outputs the print signal to a printer unit 112, thus forming images on the plurality of print sheets.

On the other hand, print data output from the client PC 102 is input to a network interface (I/F) 114 via the LAN 107. The print data is converted into printable raster data by the data processor 115, and is formed by the printer unit 112 as an image on a print sheet.

An input unit 113 which includes a key operation unit equipped on the MFP 100 and a keyboard and mouse of the management PC 101 is used to input operator's instruction to the MFP 100. A display unit 116 displays operation inputs, image processing states, and the like.

The operation of the MFP 100 is controlled by a controller 115a which is included in the data processor 115 and comprises, e.g., a one-chip microcontroller.

Note that the storage unit 111 can also be controlled from the management PC 101. Data exchange and control between the MFP 100 and management PC 101 are made via a network I/F 117 and the signal line 109 which directly connects them.

Note that the MFP 100 may comprise an interface which acquires image data from an image sensing apparatus such as a digital camera, digital video, or the like, a portable terminal such as a portable data assistant (PDA), a facsimile, or the like as a part of the input unit 113.

An ID or password required to identify the user can be input from the input unit 113. The management PC 101 determines with reference to user information recorded in the storage unit 111 or database server 105 whether or not the user of interest is a registered user, his or her authority level, and the like.

[Overview of Processing]

When a document storage instruction is input from the input unit 113, the MFP 100 reads a document image using the image reader 110. Then, the MFP 100 then transmits the document image, which is converted by the data processor 115 into a print signal that can print an image, to the document management server 106 or client PC 102 via the network I/F 114 or 117, or stores it in the storage unit 111.

When a document search instruction is input from the input unit 113, the MFP 100 reads a document image using the image reader 110, and detects pointer information present on a specific block of the document image. The pointer information indicates the location of original data, and is appended to the document image as, e.g., a two-dimensional code. The pointer information to be appended is not limited to the two-dimensional code, but it may be appended by a so-called digital watermark method which is not directly visually seen such as a method of embedding information in an image by utilizing a change in spacing between neighboring character strings, a method of embedding information in a halftone image, and the like.

The MFP 100 searches the storage unit 111, database server 105, and client PC 102 for original data of the document image in accordance with the detected pointer information. Upon searching for the original data, the MFP 100 prints out an original document based on the original data. In order to determine if the read document image matches the original data and if it is falsified, the MFP 100 supplies the read original document and original data to the management PC 101.

Figure 3:
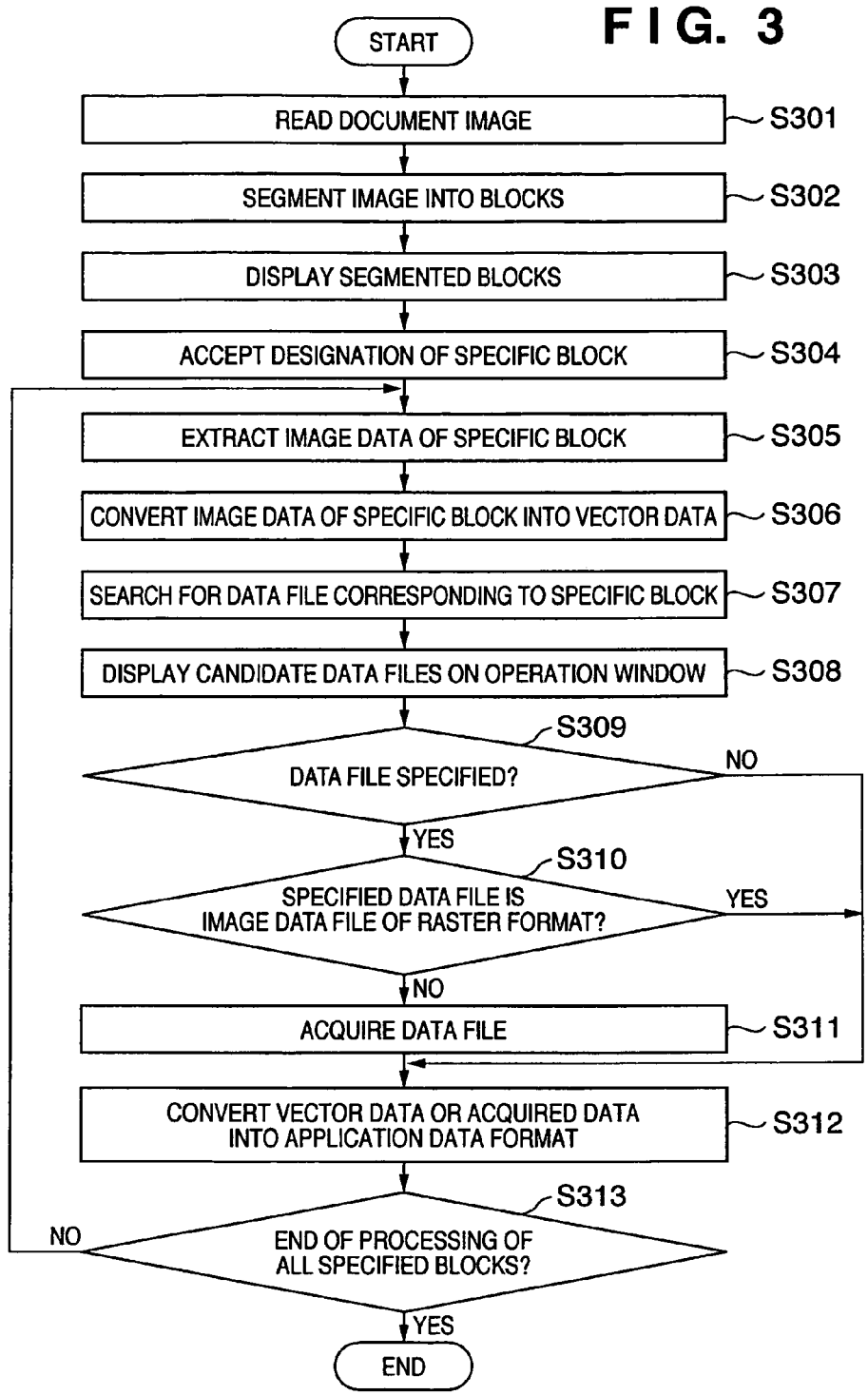
FIG. 3 is a flowchart for explaining an overview of processing by the image processing system shown in FIG. 1.

FIG. 3 is a flowchart for explaining an overview of the processing by the aforementioned image processing system.

The MFP 100 enables the image reader 110 to scan a document image for one page in a raster order, thus acquiring a read image signal. The read image signal is pre-processed by the data processor 115, and is saved in the storage unit 111 as image data for one page of the input image (S301).

Next, the management PC 101 executes block selection (BS) processing to segment the image data stored in the storage unit 111 into a text and line block including character or line images, a halftone photo block, an image block with an indeterminate form, and other blocks. Furthermore the text and line block is segmented into a text block mainly including characters and a line block mainly including a table, picture, or the like, and the line block is segmented into a table block and picture block (S302). Note that the first embodiment detects connected pixels, and segments image data into blocks of respective attributes using the shape, size, pixel density, and the like of a circumscribed rectangular block of the connected pixels. However, other block segmentation methods may be used. Upon segmenting into blocks, if pointer information is embedded in each block, that pointer information is extracted.

The text block is segmented into rectangular blocks (text block rectangular blocks) to have clusters of characters such as paragraphs and the like as blocks. The line block is segmented into rectangular blocks of individual objects (table block rectangular block, line block rectangular block) such as a table, figure, and the like. The photo block expressed by halftone is segmented into rectangular blocks such as an image block rectangular block, background block rectangular block, and the like. Note that information of these rectangular blocks will be referred to as "block segmentation information" hereinafter.

Figure 4:
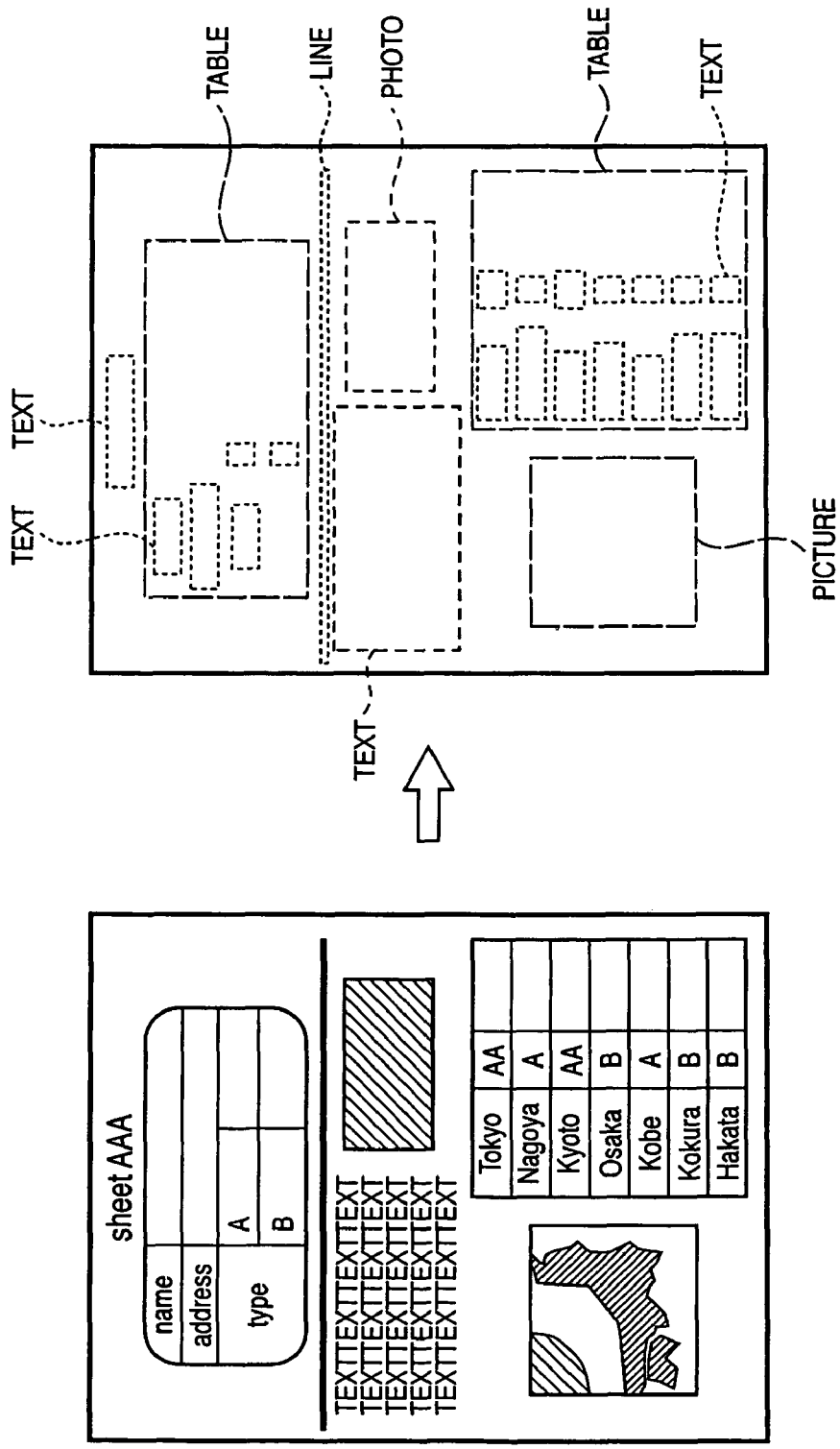
FIG. 4 shows a display example of an operation window.

The block segmentation information obtained by the BS processing and the input image are displayed in combination on an operation window of the display unit 116 (S303), as exemplified in FIG. 4. The input image itself is displayed on the left side of the operation window, and the block segmentation information is displayed as rectangular blocks on the right side. Note that FIG. 4 shows character strings TEXT, PICTURE, LINE, TABLE, and the like indicating their attributes in correspondence with respective blocks so as to allow easy understanding of rectangular blocks. However, such attribute information is not displayed on the actual operation window, and the rectangular blocks are displayed as frame borders. Of course, in addition to side-by-side display of the input image and block segmentation information shown in FIG. 4, they may be overlaid on each other so that the rectangular blocks are displayed on the input image. Hence, various other display modes are available.

Next, the user designates a rectangular block to be processed in the subsequent steps from those displayed on the operation window as a specific block (S304). As a method of designating the specific block, various methods may be adopted. For example, the user may designate one or a plurality of rectangular blocks using a pointing device. Alternatively, the operation window may comprise a touch panel, and the user may designate a desired rectangular block by touching it with a finger.

Image data of the specific block is extracted to apply the following processes to the designated specific block (S305), and is converted into vector-format data (to be referred to as "vector data" hereinafter) (this processing will be referred to as "vector conversion" hereinafter) (S306).

A data file which corresponds to the specific block or includes an image of the specific block (to be referred to as "original data file" hereinafter) is searched for (S307). The search location includes the storage unit 111, local disks on the management PC 101 and client PC 102, and document management servers 106 (database servers 105). In this case, a keyword is extracted from the optical character recognition (OCR) result of the specific block with the text attribute, and full-text search of documents including the keyword is conducted. Alternatively, layout information is acquired from information such as the presence/absence of a rectangle or special figure, the presence/absence of table format data, their positional relationship or layout, and the like with reference to the vector data of the specific block, and so-called layout search is conducted.

If data files with higher similarities are detected as a result of search, candidate data files as the search results are displayed on the operation window (S308). In this case, it is preferable to list the data files in descending order of similarity and to also display thumbnails of the candidate data files. If there are a plurality of candidate data files, the user specifies an original data file from the candidate data files with reference to the operation window. When the user determines that the original data file is hard to determine, he or she can omit this processing. If only candidate data file is found and has a high similarity, display of the search result and specification of an original data file may be omitted, and the flow may directly advance to the next step.

It is checked if an original data file is specified (S309). If no original data file is specified, the flow jumps to step S312. If an original data file is specified, it is checked if the specified original data file has a raster format or is an image data file obtained by encoding raster data represented by BMP, TIFF, or the like (S310). If the original data file is such image data file, the flow jumps to step S312. On the other hand, if the specified data file has a data format such as a character code, vector data, or the like, which can be easily re-used, that data file is acquired (S311), and the flow then advances to step S312.

If no original data file is specified or if an original data file is specified but is data of a raster data format as in the input image data, the vector data converted in step S306 is converted into an application data format. If original data with a data format which can be easily re-used is acquired, the acquired data is converted into an application data format (S312). This processing converts the acquired data into file formats for different purposes since the data format depends on an application to be used. For example, wordprocessor software, spreadsheet software, and the like as representative application software define file formats for different purposes, and a data file must be generated in such format.

As general-purpose file formats, for example, a Rich Text Format (RTF) format laid down by Microsoft®, a Scalable Vector Graphics (SVG) format which has become popular in recent years and is proposed by World Wide Web Consortium (W3C), a plane text format that simply handles text data alone, and the like are available. These data formats are more likely to be commonly used in various kinds of application software.

The processes in steps S305 to S312 are repeated until it is determined in step S313 that all designated specific blocks are converted into the application data format. Of course, if one data file including all the specific blocks is specified as an original data file, the processes in steps S305 to S312 need only be executed once.

In the first embodiment, a specific block designated by the user is converted into vector data, other blocks remain unchanged as the input image data, and they are combined and converted into the aforementioned application data format. At this time, the position information of the specific block in the input image is saved to reconstruct the entire input image.

With the above arrangement, only a block (specific block) of user's choice is converted into vector data, which can easily re-used (edited or the like). Also, blocks which cannot or should not undergo vector conversion such as a segment of the photo attribute can be prevented from inadvertently vector-converted.

The processes of principal steps shown in FIG. 3 will be described in detail below.

[Block Selection (S302)]

Block selection is processing for recognizing the image for one page shown in FIG. 4 as a set of objects, determining attributes of the respective objects as TEXT, PICTURE, PHOTO, LINE, and TABLE, and segmenting them into segments (blocks) having different attributes. A practical example of block selection will be described below.

An image to be processed is binarized to a monochrome image, and a cluster of pixels bounded by black pixels is extracted by outline tracing. For a cluster of black pixels with a predetermined area or more, outline tracing is also made for white pixels in the cluster to extract clusters of white pixels. Furthermore, extraction of clusters of black and white pixels is recursively repeated so that a cluster of black pixels is extracted from the cluster of white pixels with a predetermined area or more.

Rectangular blocks which circumscribe the obtained pixel clusters are generated, and their attributes are determined based on the sizes and shapes of the rectangular blocks. For example, a pixel cluster which has an aspect ratio close to 1, and has a size that falls within a predetermined range is determined as that of a text attribute. Furthermore, when neighboring pixel clusters of the text attribute regularly line up and can be grouped, they are determined as a text block. Also, a low-profile pixel cluster is categorized as a line block, and a range occupied by black pixel clusters that include rectangular white pixel clusters which have a predetermined size or more and a size close to a rectangle and regularly line up is categorized as a table block. Also, a block where pixel clusters with indeterminate forms are distributed is categorized as a photo block, and other pixel clusters with an arbitrary shape is categorized as a picture block.

FIGS. 5A and 5B show an example of the block selection result. FIG. 5A shows block information of each extracted rectangular block. The block information includes an attribute, coordinates X and Y of a position, width W, height H, pointer information, and the like of each block. Attributes are given as numerical values 1 to 5: "1" indicates a text attribute; "2", a picture attribute; "3", a table attribute; "4", a line attribute; and "5", a photo attribute. The coordinates X and Y indicate the X- and Y-coordinates (those of the upper left corner) of a start point of each rectangular block of the input image, the width W and height H indicate the width in the X-coordinate direction and the height in the Y-coordinate direction of the rectangular block, and the pointer information indicates the presence/absence of it.

FIG. 5B shows input file information, which indicates the total number of rectangular blocks extracted by block selection.

The block information for each rectangular block is used in vector conversion of the specific block. Based on the block information, the relative positional relationship between the vector-converted specific block and raster data can be specified, and the vector-converted block and raster data blocks can be composited without damaging the layout of the input image.

[Vector Conversion (S306)]

As the vector conversion, the following schemes are available.

(a) In case of a specific block of the text attribute, a character pattern is converted into a character code by OCR processing, or is converted into visually faithful font data by recognizing the size, style, and face of a character.

(b) In case of a specific block of the line or text attribute which cannot undergo character recognition by the OCR processing, an outline of a line image or character is traced, and outline information is converted into a format that expresses the line image or character as connection of line segments.

(c) In case of a specific block of the picture attribute, an outline of a picture object is traced, and outline information is converted into a format that expresses a figure as connection of line segments.

(d) The outline information of a line segment format obtained by the scheme (b) or (c) undergoes fitting by a Bezier function to be converted into function information.

(e) The shape of the figure is recognized based on the outline information of the picture object obtained by the scheme (c), and is converted into figure definition information such as a circle, rectangle, polygon, or the like.

(f) In case of a specific block of the table attribute, ruled lines and frame borders are recognized, and are converted into form information of a predetermined format.

In addition to the aforementioned schemes, various kinds of vector conversion which replace image data by command definition type information such as code information, figure information, function information, and the like are available.

[Vector Conversion of Text Block]

Figure 6:
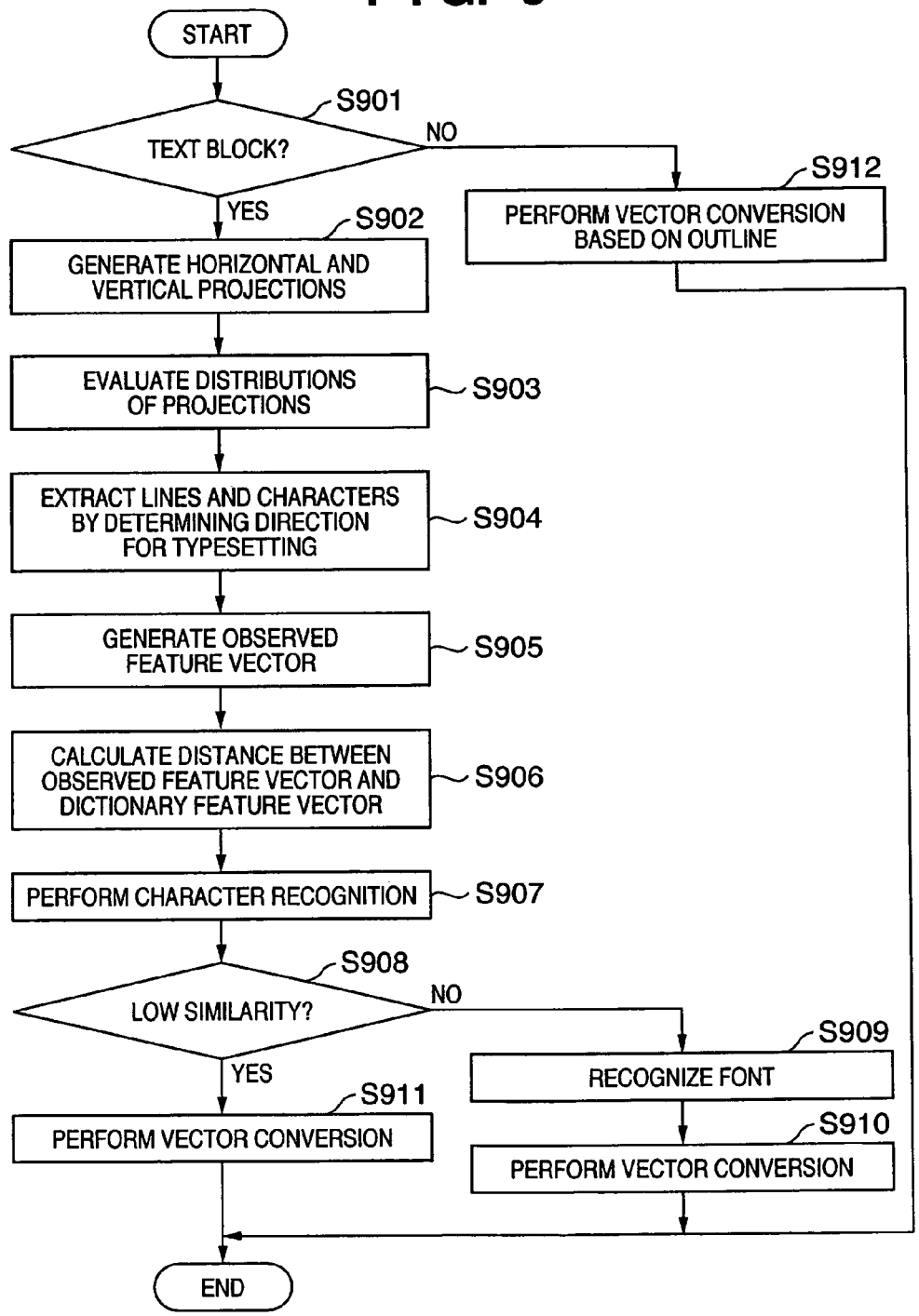
FIG. 6 is a flowchart showing details of vector conversion processing.

FIG. 6 is a flowchart showing details of vector conversion (S306), which is the processing executed by the data processor 115 (or management PC 101).

It is checked with reference to block information if a segment of interest is that of the text attribute (S901). If the segment of interest is that of the text attribute, the flow advances to step S902 to make character recognition using an arbitrary pattern matching scheme, thus obtaining a corresponding character code.

If the segment of interest is other than that of the text attribute, vector conversion based on the outline of the image is executed (S912), as will be described in detail later.

In case of the segment of the text attribute, horizontal and vertical projections of pixel values are calculated to determine horizontal or vertical writing (to determine the direction for typesetting) (S902). The distributions of the projections are evaluated (S903). If the distribution of the horizontal projection is larger, horizontal writing is determined; if that of the vertical projection is larger, vertical writing is determined.

Based on this determination result, lines are segmented, and characters are then segmented, thus obtaining character images (S904).

Upon decomposition into a character string and characters, in case of horizontal writing, lines are segmented using the horizontal projection, and characters are segmented based on the vertical projection with respect to the segmented lines. For a vertical writing text block, the processing can be done by exchanging horizontal and vertical parameters. Note that each character size can also be detected upon segmenting lines and characters.

Next, for each segmented characters, an observed feature vector obtained by converting the feature obtained from a character image into a several-ten-dimensional numerical value string is generated (S 905). Feature vector extraction may use various known methods. For example, the following method may be used. That is, a character is segmented into meshes, lines which form the character in the meshes are counted as direction-dependent line elements, and a vector having dimensions as many as the number of meshes is defined as a feature vector.

The observed feature vector is compared with feature vectors which are calculated for respective character types and are stored in a feature dictionary to calculate distances between these vectors (S906). The calculated distances are evaluated, and a character type with a smallest distance is used as a recognition result (S907). Based on the evaluation results of the distances, the smallest distance is compared with a threshold. If the smallest distance is less than the threshold, it is determined that the similarity is high; otherwise, it is determined that the similarity is low (S908). If the smallest distance is equal to or larger than the threshold (if the similarity is low), the character image of interest is more likely to be erroneously recognized as another character with a similar shape. Hence, the recognition result in step S907 is not adopted, the character image is handled in the same manner as a line image, and the outline of the character image is vector-converted (S911). In other words, for the character image which has high probability of a recognition error, visually faithful outline vector data is generated.

On the other hand, if the similarity is high, the recognition result in step S907 is adopted, and font information is output together with a character code, thus recognizing a character font (S909). Note that a plurality of feature dictionaries as many as character types used in character recognition are prepared in correspondence with character shape types, i.e., font types, thus attaining font recognition. Subsequently, each character is converted into vector data with reference to the character code and font information obtained by the character recognition and font recognition using outline data prepared in advance in correspondence with the character code and font information (S910). In case of color image data, a character color is extracted and is recorded together with vector data.

With the above processing, character images included in the segment of the text attribute can be converted into vector data which have approximately faithful shapes, sizes, and colors.

[Vector Conversion Other than Text Block (S912)]

For a segment other than that of the text attribute, i.e., that are determined as the picture, line, or table attribute, black pixel clusters are extracted, and their outlines are converted into vector data. Note that a segment of the photo attribute remains unchanged as image data without vector conversion.

Figure 7:
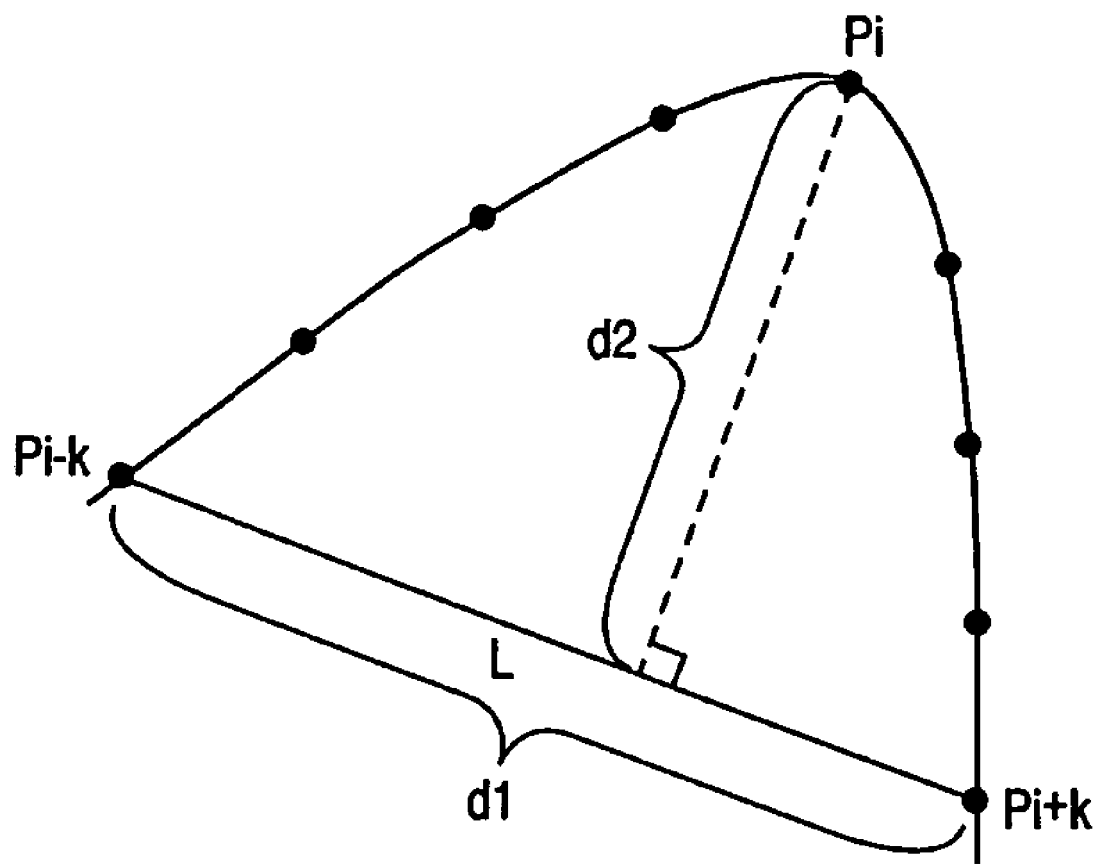
FIG. 7 is a view for explaining corner extraction processing in vector conversion.

Vector conversion other than the text block detects a "corner" which segments a curve into a plurality of sections (pixel arrays), so as to express a line image or the like as a combination of straight lines and/or curves. FIG. 7 is a view for explaining corner extraction processing in vector conversion. A corner is a point which corresponds to a maximal curvature, and whether or not a pixel Pi on a curve shown in FIG. 7 is a corner is determined as follows.

The pixel Pi is defined as a starting point, and pixels Pi−k and Pi+k which are separated from the pixel Pi by the predetermined number k of pixels in two directions along the line image curve are connected by a line segment L. Let d1 be the distance between the pixels Pi−k and Pi+k, and d2 be the length (the distance between the pixel Pi and line segment L) of a line segment dropped from the pixel Pi to the line segment L to cross at right angles. If d2 becomes maximal, or if a ratio d1/A of a length A of an arc between the pixels Pi−k and Pi+k and the distance d1 becomes equal to or smaller than a predetermined threshold, the pixel Pi is determined as a corner.

After the corner is detected, pixel arrays of the line image curve segmented by the corner are approximated by straight lines or curves. Approximation to a straight line is executed by a method of least squares or the like, and that to a curve uses a ternary spline function or the like. The pixel of the corner that segments pixel arrays becomes the start or terminal end of the approximated straight line or curve.

Furthermore, it is checked if an inside outline of a white pixel cluster exists within the vector-converted outline. If such inside outline exists, that outline is vector-converted, and inside outlines of the black and white pixel clusters are recursively vector-converted like an inside outline in an inside outline.

As described above, using the method of approximating an outline by straight lines or curves, the outline of a figure with an arbitrary shape can be vector-converted. When an input image is a color image, the color of a figure is extracted from the color image, and is recorded together with vector data.

Figure 8:
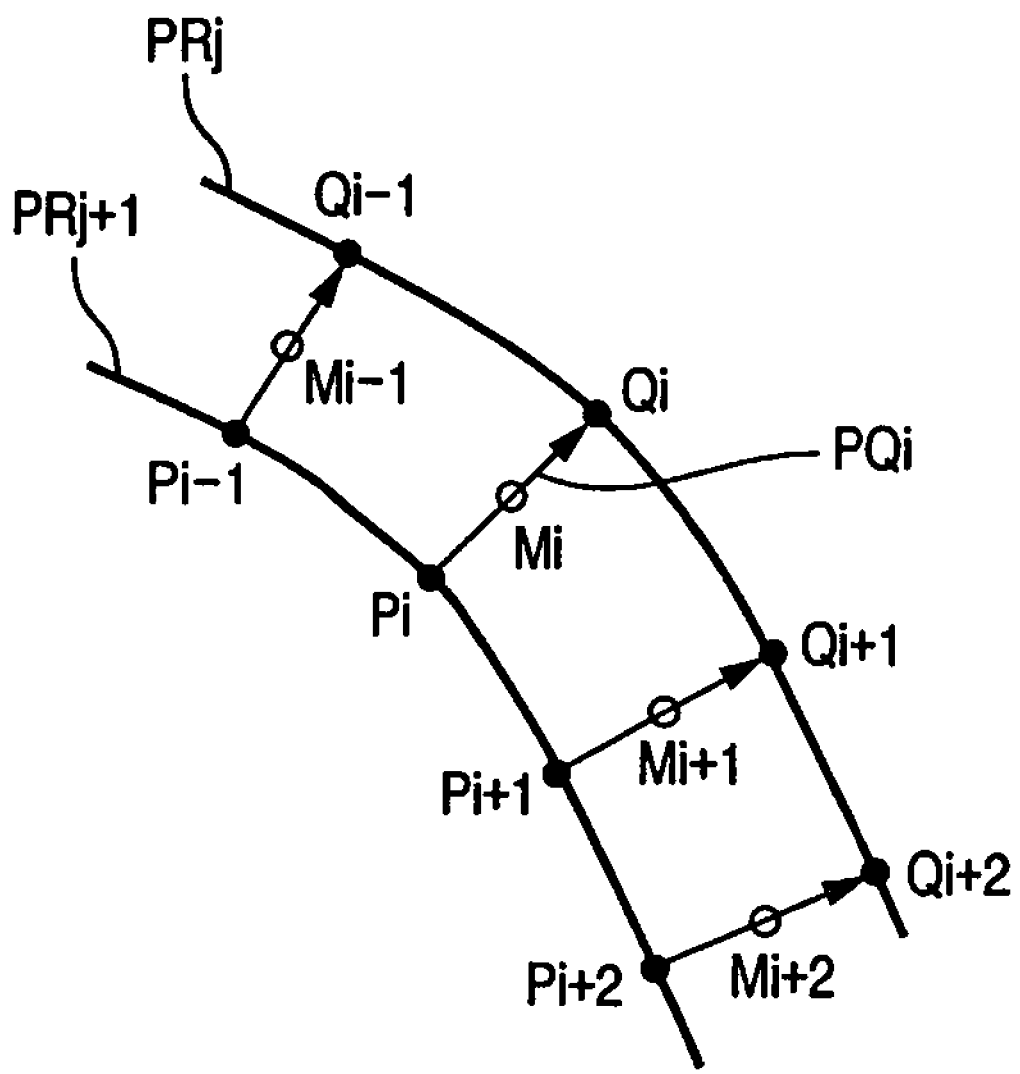
FIG. 8 is a view for explaining processing for grouping outlines in vector conversion.

FIG. 8 is a view for explaining the processing for combining outlines in vector conversion.

When an outside outline PRj is close to an inside outline PRj+1 or another outside outline within a section of interest of outlines, two or three or more outlines are combined to express a line having a given width. For example, distances PQ between pixels P on the outline PRj+1 and pixels Q on the outline PRj which have shortest distances from the pixels Pi are calculated. When variations of the distances PQi between a plurality of pixels are small, the section of interest of the outlines PRj and PRj+1 is approximated by a straight line or curve along a point sequence of middle points M of line segments PQ. The width of the approximated straight line or curve along the point sequence of the middle points M can be set to be the average value of the distances PQi.

A line or a table ruled line as a set of lines can be efficiently vector-converted by expressing them as a set of lines having a width.

[Recognition of Figure]

After the outlines of a line figure or the like are vector-converted, vector-converted partial lines are grouped for each picture object.

Figure 9:
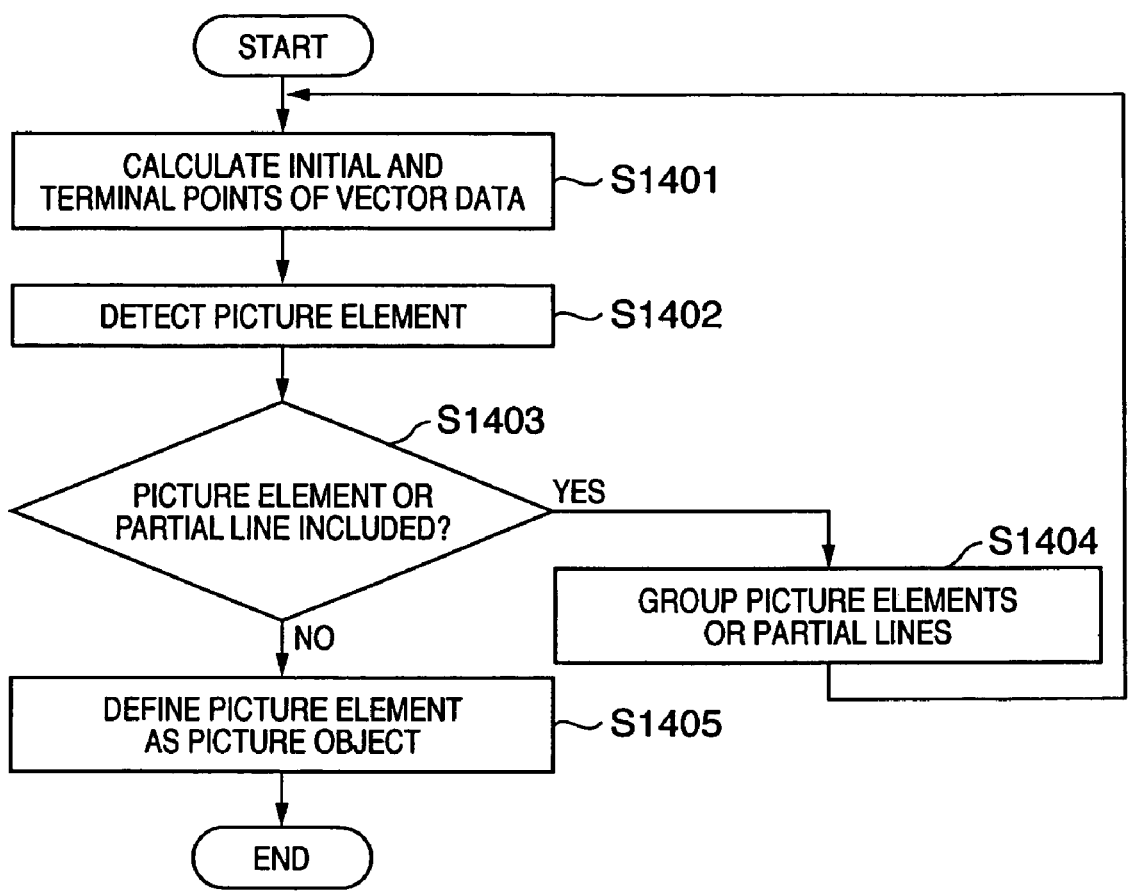
FIG. 9 is a flowchart showing grouping processing of vector data generated by vector conversion.

FIG. 9 is a flowchart showing grouping processing of vector data generated by vector conversion, i.e., processing for grouping vector data for each picture object.

Initial and terminal points of each vector data are calculated (S1401) to detect a figure element using the information of the initial and terminal points (S1402). Note that the figure element is a closed figure formed by partial lines, and vectors are connected at common corner pixels serving as the initial and terminal ends upon detection. That is, a principle that vector groups forming closed shapes have vectors to be connected at their two ends is applied.

Next, it is checked if another figure element or partial line exists in the figure element (S1403). If such figure element or partial line exists, steps S1401 and S1402 are recursively repeated. Then, these elements or lines are grouped to form a figure object (S1404). If another figure element or partial line does not exist in the figure element, that figure element is defined as one picture object (S1405).

Note that FIG. 9 shows processing for only one figure object. If another picture object exists, the processing in FIG. 9 is repeated accordingly.

Detection of Figure Element (S1402)

Figure 10:
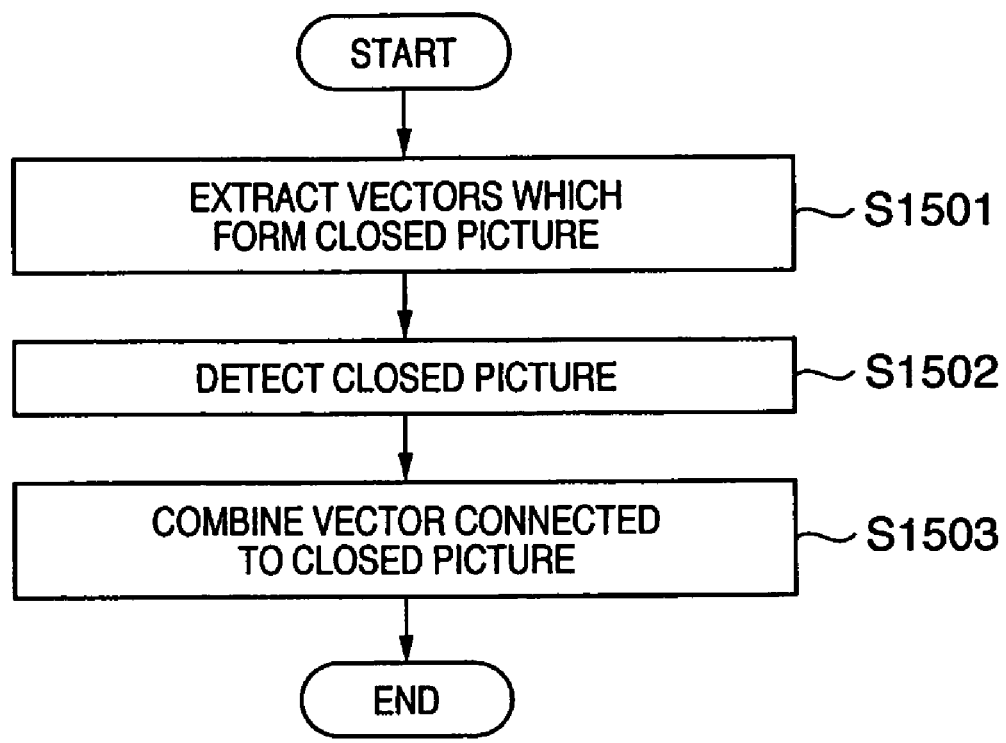
FIG. 10 is a flowchart showing detection processing of figure elements.

FIG. 10 is a flowchart showing the detection processing of figure elements.

Vectors which do not have any vectors, two ends of which are not coupled to other vectors, are excluded from vector data to extract vectors which form a closed figure (S1501).

As for the vectors which form the closed figure, one end point (initial or terminal point) of a vector of interest is set as a start point, and vectors are searched for in a predetermined direction (e.g., clockwise). That is, the end point of the other vector is searched for at the other end point, and the closest end point within a predetermined distance is defined as an end point of a vector to be connected. When all the vectors which form the closed figure are traced once until the start point is reached, all the passed vectors are grouped as a closed figure which form one figure element. (S1502). Also, all vectors which form a closed figure present in the closed figure are recursively grouped. Furthermore, the initial point of a non-grouped vector is set as a start point to repeat the same processing.

Of the excluded vectors, a vector (a vector to be connected to the closed figure) whose end point is close to the vectors grouped as the closed figure is detected, and the detected vector is grouped into that group (S1503).

With the aforementioned processing, a picture block can be handled as an independently re-usable picture object.

Normally, the aforementioned vector conversion need not always be applied to the entire input image, but it often suffices to be applied to only the specific block designated by the user. When only the specific block designated by the user is vector-converted, the processing performance can be improved. In addition, only a desired portion of the user can be efficiently vector-converted and can be used in the next search processing, or only a required portion of an image can be efficiently re-edited or re-used.

[File Search (S307)]

Figure 11:
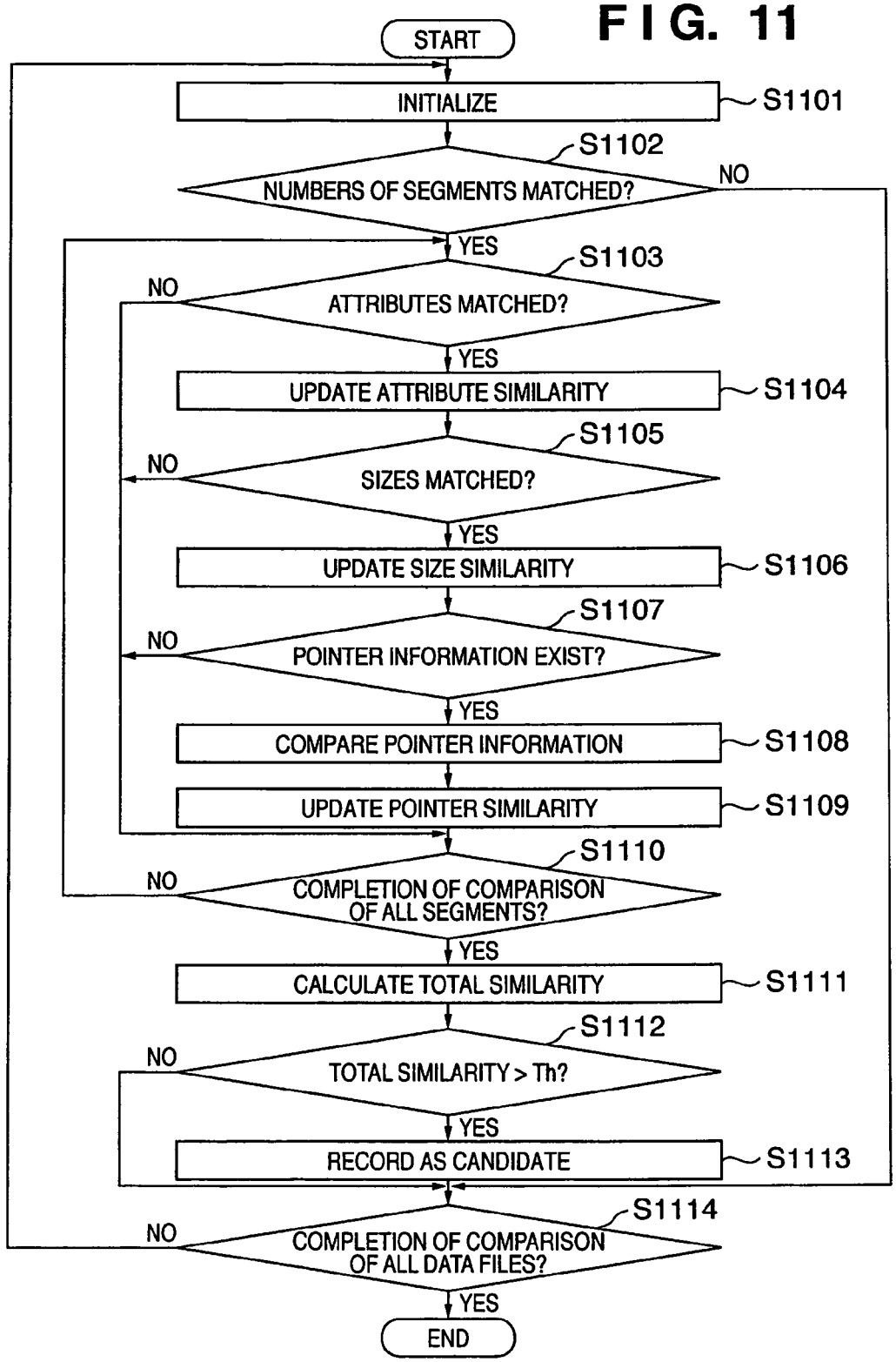
FIG. 11 is a flowchart showing search processing of a data file.

FIG. 11 is a flowchart showing the data file search processing. Assume that the input image is segmented into rectangular blocks shown in FIG. 4 as a result of the BS processing to obtain block information and input file information shown in FIGS. 5A and 5B, and vector data of the specific block designated by the user is held.

As shown in FIGS. 5A and 5B, the attribute, coordinates, width, height, and the presence/absence of pointer information are recorded for each of six segments of blocks 1 to 6, and the attribute is categorized into text, image, table, line, and photo. The total number of blocks of the input file information indicates the total number of segments in the input image. Since the total number of blocks is N=6, segments are sorted in ascending order of coordinate X and are sorted in ascending order of coordinate Y if they have the same coordinate X in the block information. Using these pieces of information, for example, data files similar to the image of the specific block are searched for with reference to block information (or information similar to block information) of data files registered in the database server 105.

Initialization is made first to initialize a similarity (to be described later) to zero (S1101). It is checked if a data file which has a total number of blocks whose difference from the total number N of blocks of the input file information falls within a predetermined value range (N−ΔN≦N+ΔN) exists (S1102). If this condition is not met, the flow jumps to step S1114.

If a data file which meets the condition is found, the block information of the data file is compared with that of the input image, comparison of attributes (S1103), that of sizes (S1105), and that of the presence/absence of pointer information (S1107) are made in turn from upper segments. If the attributes of the segments match, an attribute similarity is updated (S1104). If the sizes match, a size similarity is updated (S1106). If the pointer information is present, two pieces of pointer information are compared (S1108), and a pointer similarity is updated (S1109). It is checked if comparison of all the segments recorded in the block information of the input image is complete (S1110). If comparison of all the segments is not complete yet, the flow returns to step S1103 to compare with the next segment.

If the attributes do not match, all the similarities are not updated. If the sizes do not match, the size and pointer similarities are not updated. If no pointer information is present, a pointer similarity is not updated. After that, the flow jumps to step S1110.

Upon completion of comparison of all the segments, a total similarity of the data file to be compared is calculated on the basis of the attribute similarity, size similarity, and pointer similarity (S1111), and it is checked if the total similarity exceeds a pre-set threshold Th (S1112). If the total similarity exceeds the threshold Th, that data file is recorded as a candidate (S1113).

It is checked if comparison with all data files registered in the database server 105 is complete (S1114). If comparison with all data files is not complete yet, the flow returns to step S1101 to compare with the next data file. Upon completion of comparison of data files, the data files recorded as candidates are displayed as a list on the operation window in step S308.

The attribute similarity is updated by calculating, e.g., similarity+1/N (N is the total number of blocks). It is determined that the sizes match when the size difference falls within predetermined ranges W−ΔW<w<W+ΔW and H−ΔH<h<H+ΔH. Also, the size similarity is updated by defining 1−(w−W)/W (W is the size of a segment of interest of the input image) as a size similarity of each segment, and calculating the average value of the size similarities of all segments. Furthermore, the pointer similarity is updated by calculating a ratio of matching characters by comparing the character strings of the pointer information, and calculating the average value of the pointer similarities of all segments. Moreover, the total similarity may be calculated by calculating the sum total of the similarities. Alternatively, predetermined weights may be given to the respective similarities, and their sum total may be calculated.

Note only size comparison of segments but also comparison of position information (coordinates X and Y) may be added.

In the aforementioned processing, vector data which can be used in file search (S307) are as follows: vector data which is generated in step S306 for the specific block designated by the user, character code information acquired by the OCR processing, layout information indicating vertical/horizontal writing or the like, the number and layout of figures by figure recognition, font information in a document by font recognition, and the like.

In this manner, since detailed vector data of the specific block of interest of the user is used in similarity calculations in file search in addition to layout information obtained by the BS processing, a file search time can be shortened, and its precision can be improved. In file search, since the weight of vector data of the specific block can be increased, and similarities can be calculated by attaching an importance on the portion of interest of the user, search results that meet the user's desire can be obtained.

[Conversion into Application Data Format (S312)]

Figure 12:
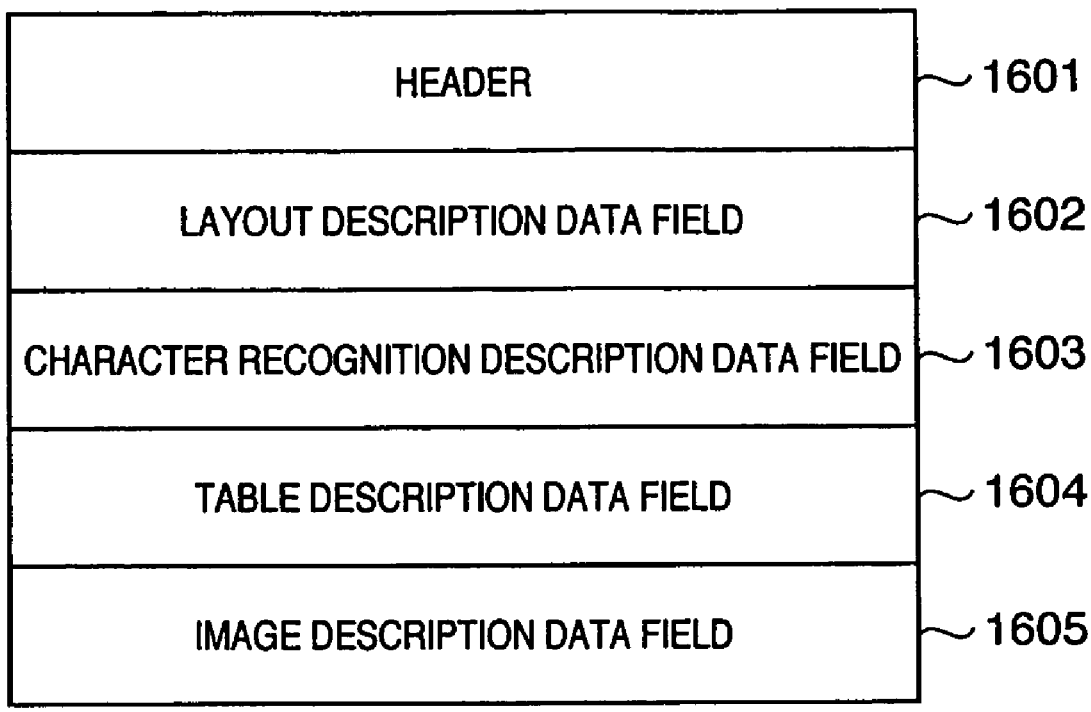
FIG. 12 shows the format of intermediate data indicating the vector conversion result.

FIG. 12 shows the format of intermediate data indicating the vector conversion result. Intermediate data is saved in a format called a document analysis output format (DAOF).

The DAOF includes a header 1601, layout description data field 1602, character recognition description data field 1603, table description data field 1604, and image description data field 1605. The header 1601 holds information that pertains to the input image to be processed.

The layout description data field 1602 holds information such as TEXT, TITLE, CAPTION, LINE, PICTURE, FRAME, TABLE, PHOTO, and the like indicating the attributes of rectangular segments in the input image, and position information of these rectangular segments.

The character recognition description data field 1603 holds the character recognition result obtained by applying character recognition to the specific block designated by the user of the rectangular segments of the text attribute such as TEXT, TITLE, CAPTION, and the like.

The table description data field 1604 holds details of the table structure of the rectangular segment of the table attribute, and holds image data segmented from the input image data in the rectangular segments of the picture attribute and line attribute.

The image description data field 1605 of the vector-converted specific block holds a set of data indicating the internal structure, image shape, character code, and the like of a segment obtained by vector conversion. On the other hand, the image description data field 1605 holds the input image data itself for a segment other than the specific block, which are not vector converted.

Figure 13:
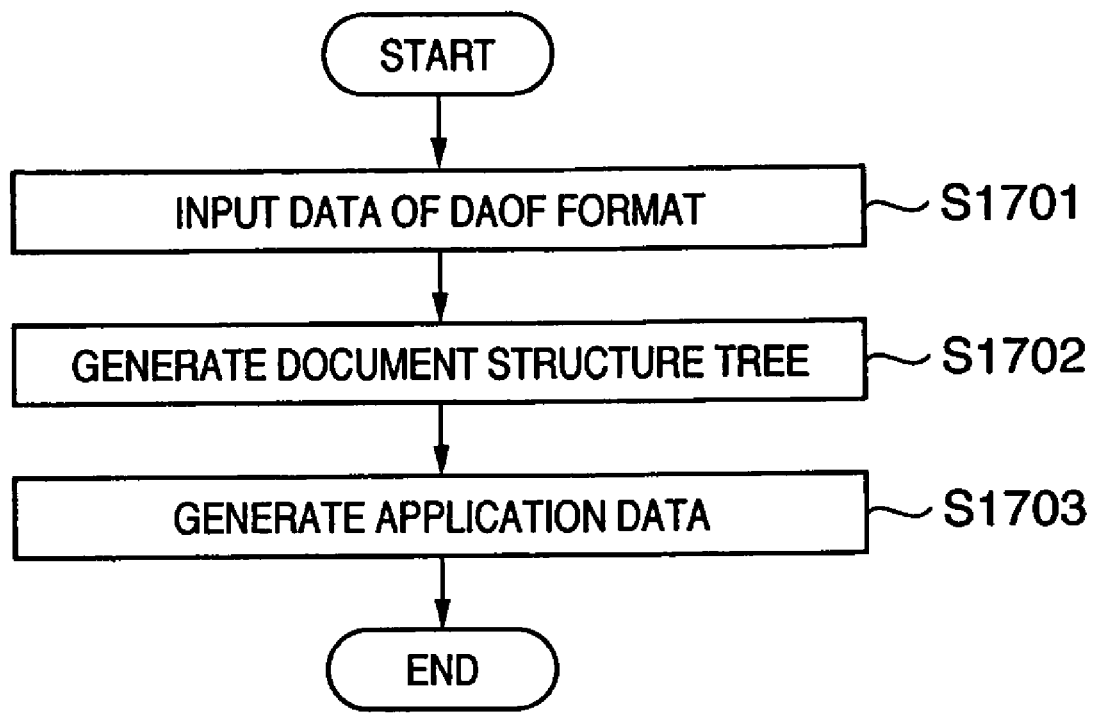
FIG. 13 is a flowchart showing conversion processing into an application data format.

FIG. 13 is a flowchart showing the conversion processing into the application data format.

Data of the DAOF format is input (S1701), a document structure tree as a basis of application data is generated (S1702), and real data in the DAOF is acquired based on the document tree structure to generate application data (S1703).

Figure 14:
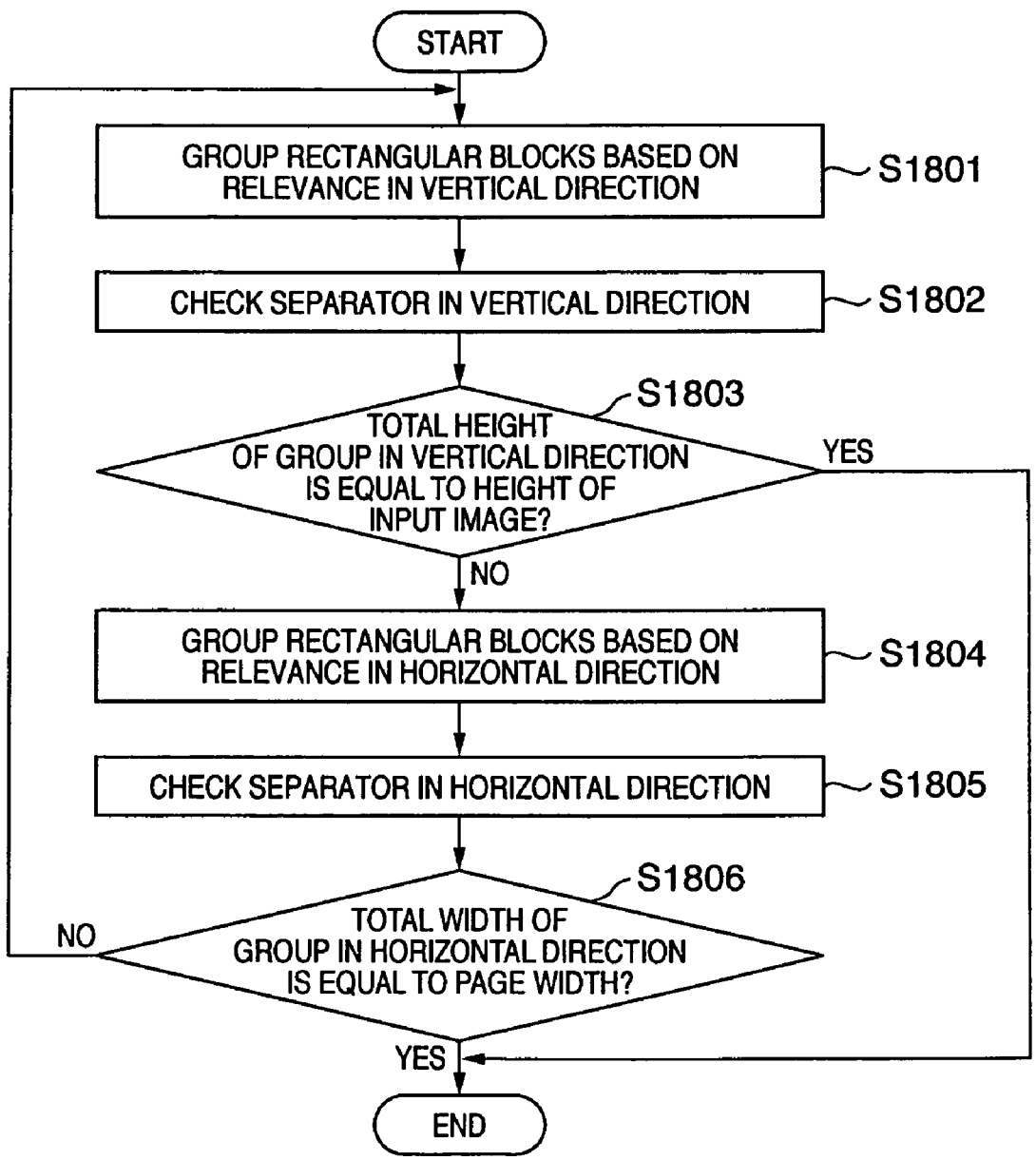
FIG. 14 is a flowchart showing details of document structure tree generation processing (S1703)

FIG. 14 is a flowchart showing details of the document structure tree generation processing (S1703). As a basic rule of the overall control in this processing, the flow of processes transits from a microblock (single rectangular block) to a macroblock (a set of rectangular blocks). In the following description, "rectangular block" implies both a microblock and macroblock.

Rectangular blocks are grouped for respective rectangular blocks on the basis of relevance in the vertical direction (S1801). Note that the processing shown in FIG. 14 is often repetitively executed. Immediately after the beginning of processing, determination is made for respective microblocks. Note that relevance can be defined by features indicating if the distance between neighboring rectangular blocks is small, rectangular blocks have nearly the same block widths (heights in case of the horizontal direction), and so forth. Information of the distances, widths, heights, and the like can be extracted with reference to the DAOF.

Figure 15:
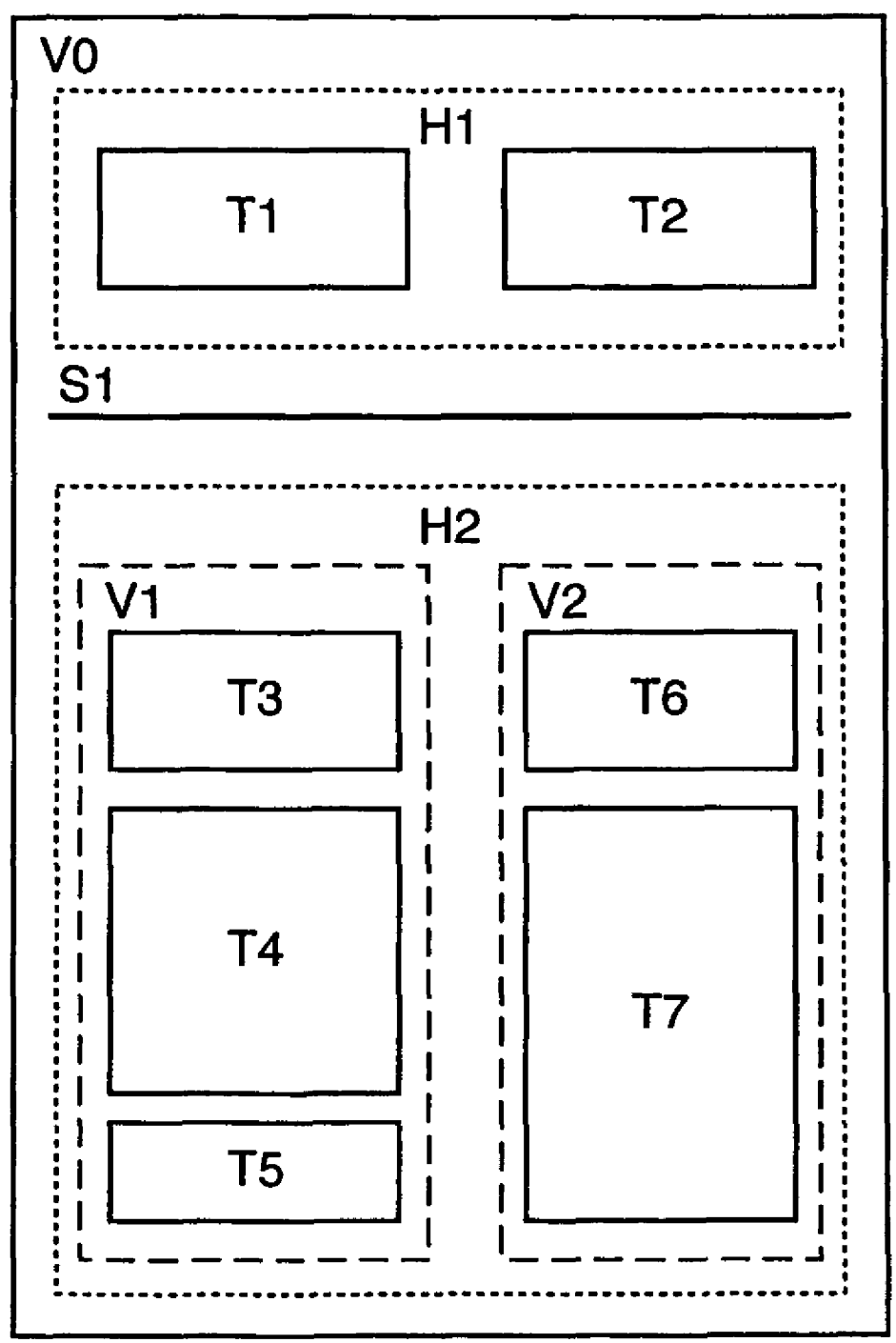
FIG. 15 shows an example of an input image.

For example, in case of an input image shown in FIG. 15, rectangular blocks T1 and T2 are juxtaposed in the horizontal direction in its uppermost portion. A horizontal separator S1 is present below the rectangular blocks T1 and T2, and rectangular blocks T3, T4, T5, T6, and T7 are present below the horizontal separator S1. The rectangular blocks T3, T4, and T5 are laid out in the vertical direction from top to down on the left half portion of a block below the horizontal separator S1. The rectangular blocks T6 and T7 are laid out from top to down on the right half portion of the block below the horizontal separator S1.

If grouping based on the relevance in the vertical direction is executed in step S1801, the rectangular blocks T3, T4, and T5 are combined into one group (rectangular block V1) and the rectangular blocks T6 and T7 are combined into another group (rectangular block V2). The groups V1 and V3 belong to an identical layer.

Next, the presence/absence of a vertical separator is checked (S1802). The separator is an object having the line figure attribute in the DAOF, and has a function of explicitly separating blocks in application software. Upon detection of the separator, the block of the input image is divided into right and left blocks to have the separator as a boundary in the layer to be processed. The example of FIG. 15 includes no vertical separator.

It is then checked if the total of the heights of the groups in the vertical direction is equal to that of the input image (S1803). That is, if grouping in the horizontal direction is done by shifting the block to be processed in the vertical direction (e.g., from top to down), it is checked if the processing is to end by utilizing the fact that the total of the heights of the groups becomes equal to that of the input image upon completion of the processing for the entire input image.

If grouping is not complete yet, rectangular blocks are grouped on the basis of relevance in the horizontal direction (S1804). In this way, the rectangular blocks T1 and T2 shown in FIG. 15 are combined into one group (rectangular block H1) and the rectangular blocks V1 and V2 are combined into one group (horizontal block H2). The groups H1 and H2 belong to an identical layer. Even in this case, immediately after the beginning of the processing, determination is made for respective microblocks.

Next, the presence/absence of the horizontal separator is checked (S1805). Upon detection of the separator, the block of the input image is divided into upper and lower blocks to have the separator as a boundary in the layer to be processed. Note that FIG. 15 includes the horizontal separator S1.

It is checked if the total of the widths of the groups in the horizontal direction is equal to that of the input image (S1806). With this process, it is checked if grouping in the horizontal direction is complete. If the total of the widths of the groups in the horizontal direction is equal to that of the input image (page width), the document structure tree generation processing ends. If the total of the widths of the groups in the horizontal direction is less than the page width, the flow returns to step S1801 to repeat the processing from the step of checking the relevance in the vertical direction.

Figure 16:
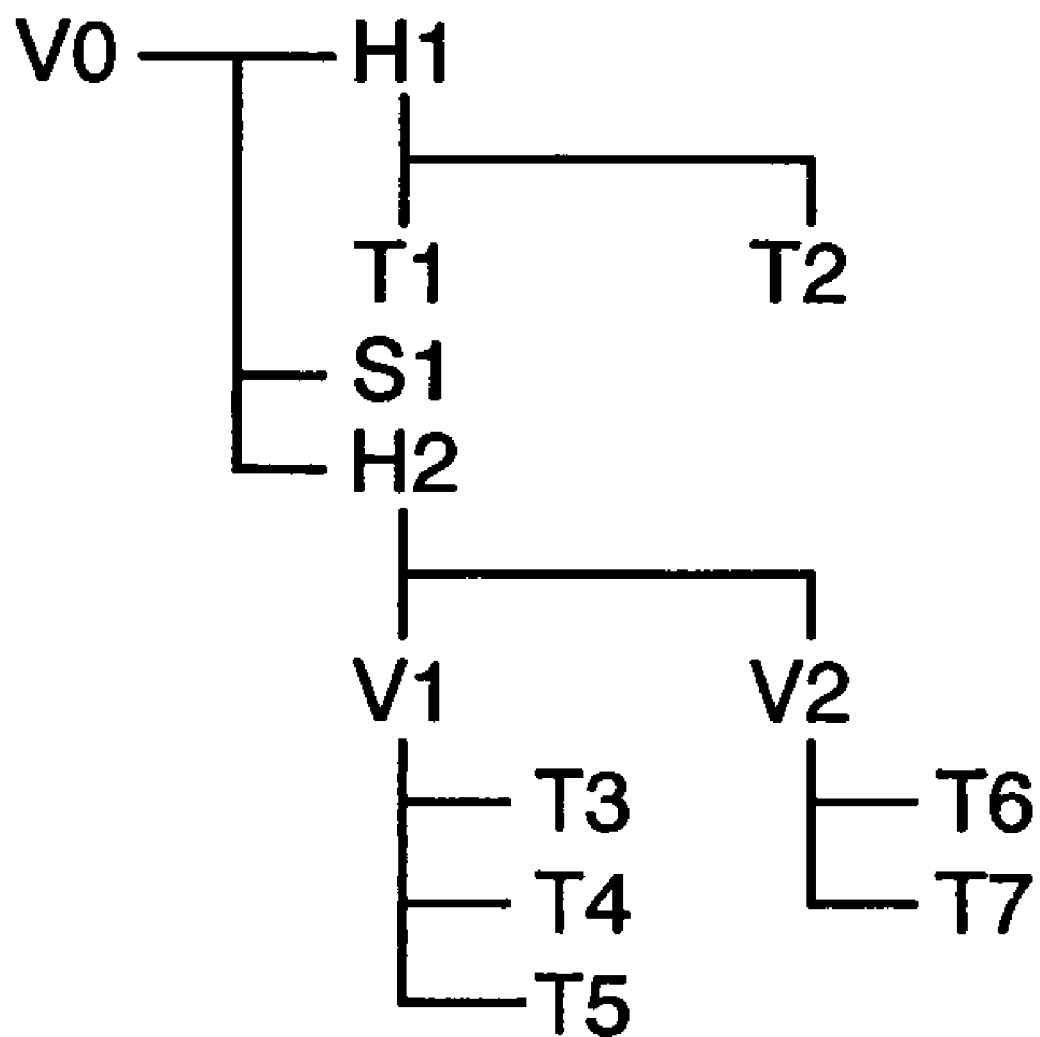
FIG. 16 shows a document structure tree obtained from the image shown in FIG. 15.

FIG. 16 shows the document structure tree obtained from an image V0 shown in FIG. 15.

The image V0 includes the groups H1 and H2 in the uppermost layer, and the rectangular blocks in the second layer belong to the group H1. The groups V1 and V2 in the second layer belong to the group H2. The rectangular blocks T3, T4, and T5 in the third layer belong to the group V1. The rectangular blocks T6 and T7 in the third layer belong to the group V2.

When the three shown in FIG. 16 is reached, since the total of the widths of the groups in the horizontal direction becomes equal to the page width, the processing ends, and V0 of the uppermost layer indicating the entire page is finally appended to the document tree structure. After completion of the document tree structure, application data is generated based on its information.

Since the group H1 has the two rectangular blocks T1 and T2 in the horizontal direction, two columns are set, and the internal information (text as a character recognition result, image, and the like) of the rectangular block T1 is output to the first column (left column) with reference to the DAOF of T1. After that, the second column (right column) is selected, the internal information of T2 is output, and the separator S1 is then output.

Next, the group H2 is selected. Since the group H2 has the two rectangular blocks V1 and V2 in the horizontal direction, two columns are set, and internal information is output to the first column (left column) in the order of the rectangular blocks T3, T4, and T5 of the group V0. After that, the second column (right column) is selected, and internal information is output to the selected column in the order of the rectangular blocks T6 and T7 of V2.

With the aforementioned processing, the conversion processing to the application data format is executed.

In the description of the above example, the user designates one or a plurality of rectangular blocks automatically generated by the BS processing using the input unit 113 or the like as the specific blocks to be vector-converted. However, the present invention is not limited to this. For example, the user may bound a desired block on a document using a line marker pen or the like to designate a specific block.

[Security]

Assume that the MFP 100 shown in FIG. 1 equips an illicit copy protection function and user authentication system for the purpose of security. As shown in FIG. 20, each user logs in the MFP 100, and performs user authentication. Therefore, uses other than authentic users cannot print any secret documents or cannot copy documents which have been printed once. Note that user authentication is executed by the management PC 101 based on information registered in, e.g., the database server 105 or storage unit 111. Illicit copy protection is executed by the management PC 101 based on add-on information of a document.

The organizer of a conference must reliably distribute a highly confidential reference to participants, and must collect and discard them after the conference. Such rules must be held to prevent leakage of secrets and to protect privacy. of course, upon delivering highly confidential documents, security of the same kind is demanded. As a typical example, distribution of a reference for a conference will be described below. However, the processing to be described below can be applied to all documents that must be delivered, collected, and discarded.

Figure 17:
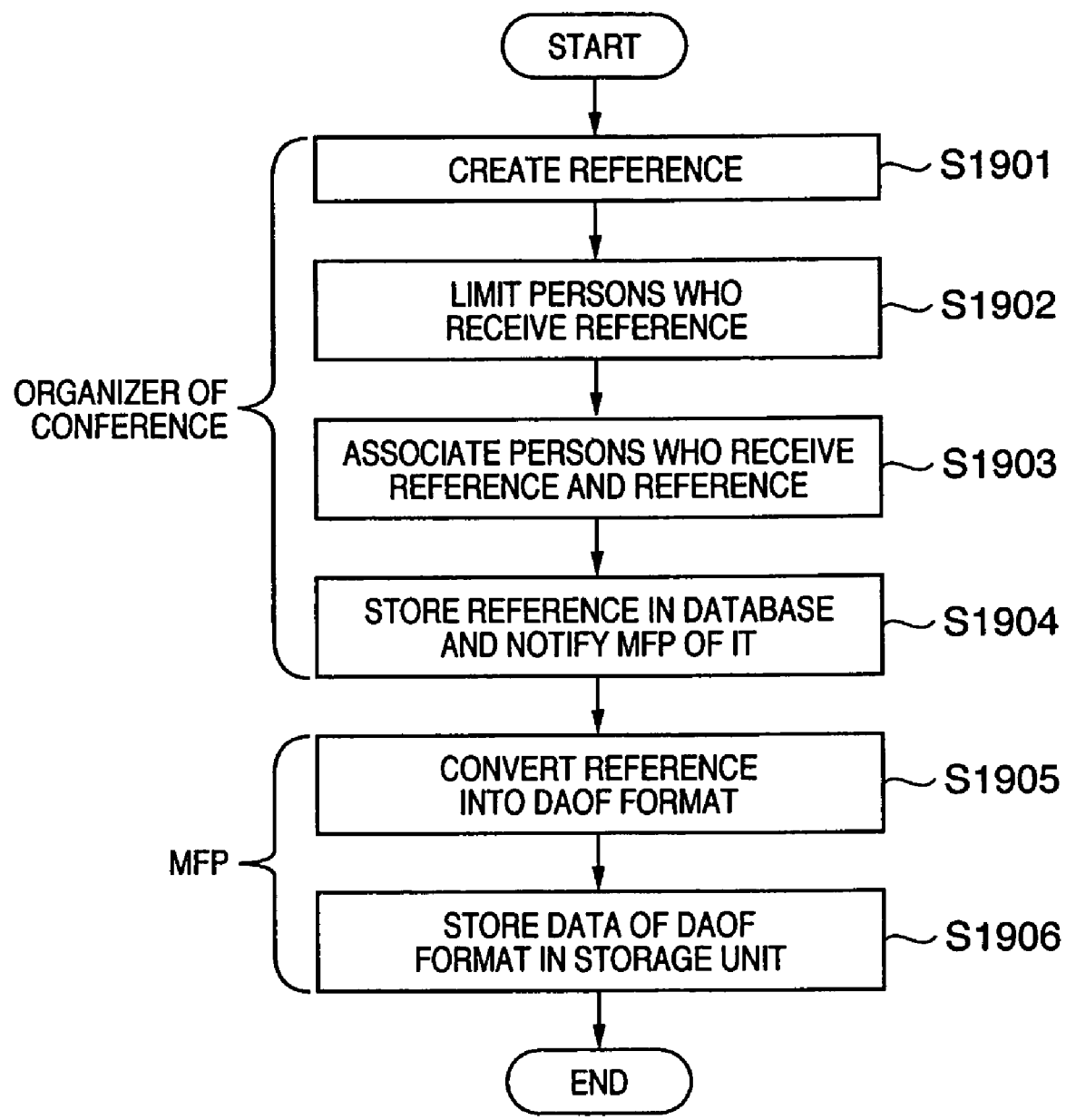
FIG. 17 is a flowchart showing the reference preparation sequence.

FIG. 17 is a flowchart showing the reference preparation sequence.

The organizer creates a reference used in a conference using a desired application program (S1901), limits persons who receive the reference (S1902), and associates the persons who receive the reference with the reference by entering the names of the persons who receive the reference (S1903). In this case, the contents of the reference are often partially masked or changed depending on the persons who receive the reference. The organizer registers conference information in the storage unit of the MFP 100 or in the database server 105 via the document management server 106, and registers the document (reference) and information indicating the persons who receive the reference in association with the conference information. The organizer then operates the input unit 113 to send a message that advises accordingly to the MFP 100 (S1904).

Upon reception of this message, the MFP 100 applies the BS processing to the document (reference) registered by the organizer to vector-convert the document so as to facilitate search processing of a data file corresponding to the collected references after collection of the distributed references (S1905). The MFP 100 registers the vector-converted document (reference) as data in the DAOF format in the storage unit 111 or in the database server 105 via the document management server 106 (S1906). Note that the MFP 100 may be any MFP on the LAN in the office or may be limited to an MFP equipped in a conference room where the conference will be held.

Figure 18:
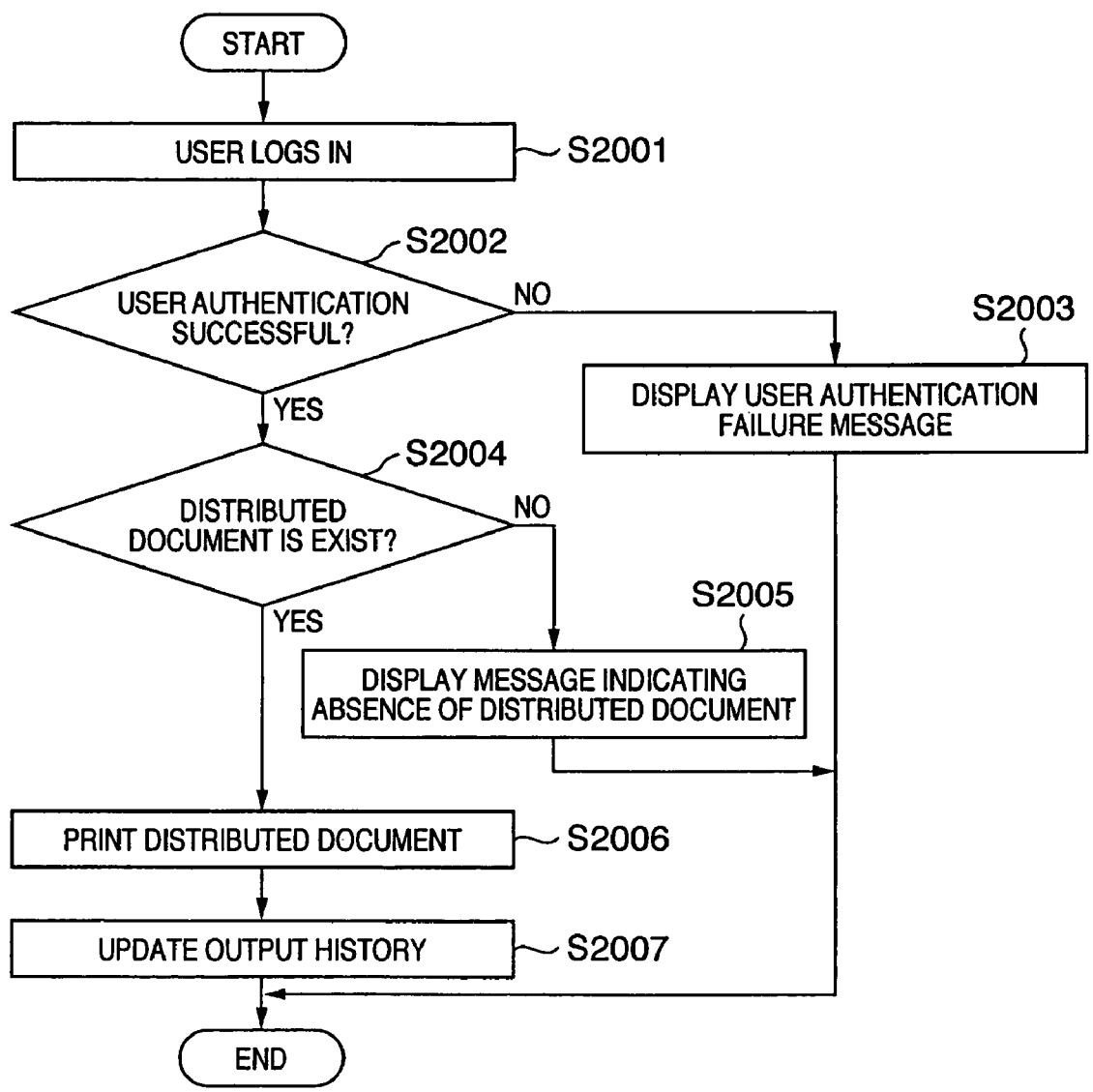
FIG. 18 is a flowchart showing the document distribution sequence by the MFP.

FIG. 18 is a flowchart showing the document distribution sequence by the MFP.

Each participant of the conference logs in the MFP 100 to print the reference (S2001). The MFP 100 performs user authentication of that participant (S2002). If the user authentication has failed, the MFP 100 displays a user authentication failure message on the display unit 116 (S2003).

If the user authentication has succeeded, the MFP 100 searches for the document (reference) to be distributed to that participant (S2004). If no document (reference) is found, the MFP 100 displays a message indicating that no document to be distributed is found on the display unit 116 (S2005). If the document to be distributed is found, the MFP 100 prints that document (reference) (S2006), and updates the output history of the document to be distributed registered in the database server 105 via the document management server 106 (S2007). Note that the output history includes document information, the aforementioned conference information, print date/time and the number of copies, login user information, identification information of the MFP 100, and the like.

Note that FIG. 20 shows an example in which documents (references) A, B, and C are stored in the storage unit 111 in correspondence with users A, B, and C as the participants of a conference. Therefore, when user A logs in, document (reference) A is printed. Likewise, when users B and C log in, documents (references) B and C are printed, respectively. In this manner, the documents to be distributed to the participants of the conference can be reliably distributed.

FIG. 19 is a flowchart showing the collection sequence of the documents (references) by the MFP 100.

After completion of the conference, user A as the participant makes the image reader 110 of the MFP 100 read an image of document (reference) A (S2101), as shown in FIG. 21. Note that the organizer inputs the conference information of the document (reference) whose image is to be read before the beginning of reading of the image, and collects the document (reference) whose reading is complete. The MFP 100 checks with reference to information in the database server 105 or storage unit 111 if all pages of the document (reference) have been read (S2102). If the number of pages is short, the MFP 100 displays a message that advices (warns) accordingly on the display unit 116 (S2103). In addition to the warning, that message may be sent to the organizer via e-mail or may be recorded in a log. Note that the present invention is not limited to the message which is displayed or sent via e-mail. However, the message may be output by other methods such as audio or the like.

The MFP 100 applies the BS processing to the read document image to vector-convert it (S2104). The MFP 100 refers to data in the DAOF format registered in the storage unit 111 or database server 105 using the vector-converted image as a query image. Then, the MFP 100 searches for data files which match or are similar to the read document image by the aforementioned data file search processing (S2105). Even when the document is written with a memo or is contaminated, an original data file can be detected based on the similarities of segments via the BS processing and vector conversion. On the other hand, when pointer information of an original data file is recorded using a two-dimensional code, and that two-dimensional code is damaged or contaminated, the original data file cannot be detected.

If the original data file cannot be detected, or if the read document image is partially lost (S2106), the MFP 100 displays a message that advices (warns) accordingly on the display unit 116. At the same time, the MFP 100 notifies the organizer of the partial loss information, information of the person who receives the reference, a message indicating that the search processing has failed, and the pointer information of the read document image via e-mail or the like, and records these pieces of information in a log (S2107). If the original data file is detected, the MFP 100 deletes that data file (S2108). FIG. 21 shows an example wherein document A corresponding to reference A distributed to user A is deleted from the storage unit 111. Note that the present invention is not limited to the message which is displayed or sent via e-mail. However, the message may be output by other methods such as audio or the like.

If it is determined that collection of the distributed references is complete upon completion of reading of the document images by all the participants by the MFP 100, the organizer notifies the MFP 100 of completion of collection via the input unit 113 (S2109). Before reception of this message, the MFP 100 repeats the processes in steps S2101 to S2108 in response to a read instruction of the document image in step S2101.

Upon reception of the collection completion message, the MFP 100 refers to (checks) information in the storage unit 111 or database server 105 to see if all the data files associated with the conference have are deleted (S2110). If all the data files are deleted, the MFP 100 displays a message indicating that all the data files are deleted on the display unit 116 (S2114), thus ending the processing. Note that the present invention is not limited to the message which is displayed or sent via e-mail. However, the message may be output by other methods such as audio or the like.

If data files to be deleted still remain, the MFP 100 refers to (checks) the output history of the data files registered in the database server 105 to see if the data file of interest is printed (S2111). If that data file is not printed, the MFP 100 deletes that data file (S2112), and displays a message indicating that all the data files are deleted on the display unit 116 (S2114), thus ending the processing. Note that the present invention is not limited to the message which is displayed or sent via e-mail. However, the message may be output by other methods such as audio or the like.

If the data file to be deleted is printed (to maintain the output history), the MFP 100 displays a message indicating that the distributed reference remains uncollected on the display unit 116. At the sake time, the MFP 100 notifies the organizer of information (file name, conference name, name of a person who receives the reference, print date/time, the number of copies, and the like) associated with the data file (S2113), thus ending the processing. Note that the present invention is not limited to the message which is displayed or sent via e-mail. However, the message may be output by other methods such as audio or the like.

In this manner, by utilizing digital documents stored in the storage device, references are reliably distributed, whether or not the distributed references are collected is determined, and the digital documents in the storage device corresponding to the collected references can be deleted. Of course, uncollected references can also be detected. Therefore, the security of the distributed references of a conference or the like can be improved. In the above description, documents (references) A, B, and C have been explained as independent documents (files). However, when a common reference is distributed to users A, B, and C, only one document (file) may be used. In this embodiment, user information is stored in correspondence with the document upon printing the document. Upon collecting the document, after the user logs in the MFP 100 again, he or she may make the MFP 100 read the document (reference). The MFP 100 confirms that the document (reference) is read without any omission, and records a message indicating the document (reference) of that user is collected in the log. After the documents (references) distributed to all the users are collected without any omission, the MFP 100 deletes the document (file), and executes the same processing as in step S2114.

As described above, the MFP 100 used to distribute the references and to collect them may be limited to an MFP equipped at a specific location such as a conference room or the like. Alternatively, a data file of a reference to be distributed may be saved in a storage device shared by respective offices, and after the user as the distribution destination prints the reference to the distributed, the data file in the storage device may be deleted. Then, the specific MFP equipped in the conference room or the like may collect the distributed references, and collection of the distributed references may be confirmed with reference to a data file separately stored in the storage unit of that MFP. Of course, after confirmation of collection, the data file stored in the storage unit of that MFP is deleted.

In this way, even when a two-dimensional code on a document is damaged, original data (digital document) can be detected. Simultaneously with detection of the original data, collection of the document can be determined. Furthermore, since the original data can be erased, erasure of the original document can be executed simultaneously with collection of the document, thus improving the security.

A highly confidential document or a document that concerns privacy can be distributed to limited users as destinations, and such document can be reliably corrected and the corresponding digital document can be erased. Hence, the present invention can contribute to prevention of leakage of secrets and protection of privacy.

In the method of managing original data by giving an ID or address using a two-dimensional code to a document, the ID or address cannot be recognized due to contamination or damage of the document, and the original data cannot often be detected. By contrast, this embodiment can provide an original data search/detection method robust against contamination or damage of documents by applying the BS processing and vector conversion.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a flexible disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-347235, filed on Nov. 30, 2004, which is hereby incorporated by reference herein.

What is claimed is:

1. An image processing apparatus comprising:
a memory that stores at least one secret digital document;
an authenticator constructed to authenticate a user;
a printer constructed to print a printed document corresponding to a secret digital document stored in the memory on a print medium for a user authenticated by said authenticator;
an updater constructed to update an output history when said printer prints a printed document corresponding to a secret digital document stored in the memory for the authenticated user, wherein the output history includes at least information of the secret digital document, a number of printed documents corresponding to the secret digital document, and information of the authenticated user;
a reader constructed to read an image of the printed document printed by said printer; and
a controller constructed to:
in a case where a user is authenticated, supply a secret digital document stored in the memory to said printer to print a printed document corresponding to the secret digital document on a print medium, wherein the secret digital document corresponds to the authenticated user;
receive an image of the printed document supplied from said reader;
search the memory for the secret digital document that corresponds to the image supplied from said reader; and in a case where the secret digital document corresponding to the image supplied from said reader is detected by the search, delete the detected secret digital document from the memory, the apparatus further comprising:

a segmentation section constructed to segment, into blocks, the image supplied from the reader and each secret digital document stored in the memory;

a converter constructed to convert the segmented blocks of the image supplied from the reader into vector data, and to convert the segmented blocks of each secret digital document into vector data; and a block comparator constructed to compare the vector data for each block of the image supplied from the reader with the vector data for each block of each secret digital document stored in the memory to calculate, for each secret digital document stored in the memory, a similarity between the image supplied from the reader and the secret digital document, wherein a secret digital document stored in the memory that has a similarity that exceeds a pre-set threshold is the secret digital document detected by the search, and wherein there are plural users to be authenticated, printed documents corresponding to secret digital documents stored in the memory for the authenticated users are printed respectively by said printer, said controller deletes the secret digital documents corresponding to the printed documents from the memory based on the reception of images from said reader and the search for the secret digital documents, and determines whether or not all of the secret digital documents corresponding to the printed documents are deleted by referring to the output history updated by said updater, and in a case where at least one of the secret digital documents corresponding to the printed documents is not deleted, said controller issues a message indicating information of at least one of the printed documents based on the output history so as to prompt to collect the at least one of the printed documents.

2. The apparatus according to claim 1, wherein when the image supplied from said reader has a shortage of a number of pages or a partial loss of the image, or when the search does not detect the secret digital document corresponding to the image, said controller informs a message that advises accordingly.

3. A method of controlling an image processing apparatus which comprises a reader and a printer, said method comprising the steps of:

storing at least one secret digital document in a memory;

authenticating a user;

in a case where the user is authenticated, supplying a secret digital document stored in the memory to the printer to print a printed document corresponding to the secret digital document on a print medium, wherein the secret digital document corresponds to the authenticated user;

updating an output history when the printer prints a printed document corresponding to a secret digital document stored in the memory for the authenticated user, wherein the output history includes at least information of the secret digital document, a number of printed documents corresponding to the secret digital document, and information of the authenticated user;

receiving an image of the printed document supplied from the reader;

searching the memory for the secret digital document that corresponds to the image supplied from the reader; and in a case where the secret digital document corresponding to the image supplied from the reader is detected by the search, deleting the detected secret digital document from the memory, the method further comprising:

segmenting, into blocks, the image of the printed document supplied from the reader and each secret digital document stored in the memory;

converting the segmented blocks of the image supplied from the reader into vector data, and converting the segmented blocks of each secret digital document stored in the memory into vector data; and comparing the vector data for each block of the image supplied from the reader with the vector data for each block of each secret digital document stored in the memory to calculate, for each secret digital document stored in the memory, a similarity between the image supplied from the reader and the secret digital document, wherein a secret digital document stored in the memory that has a similarity that exceeds a pre-set threshold is the secret digital document detected by the search, and wherein there are plural users to be authenticated, printed documents corresponding to secret digital documents stored in the memory for the authenticated users are printed respectively by the printer, the method further comprising:

deleting the secret digital documents corresponding to the printed documents from the memory based on the reception of images from the reader and the search for the secret digital documents;

determining whether or not all of the secret digital documents corresponding to the printed documents are deleted by referring to the output history updated in the updating step; and issuing, in a case where at least one of the secret digital documents corresponding to the printed documents is not deleted, a message indicating information of at least one of the printed documents based on the output history so as to prompt to collect the at least one of the printed documents.

* * * * *